Sept. 20, 1960 N. B. COLEY 2,953,772
CODE COMMUNICATION SYSTEM
Filed Feb. 6, 1956 12 Sheets-Sheet 1
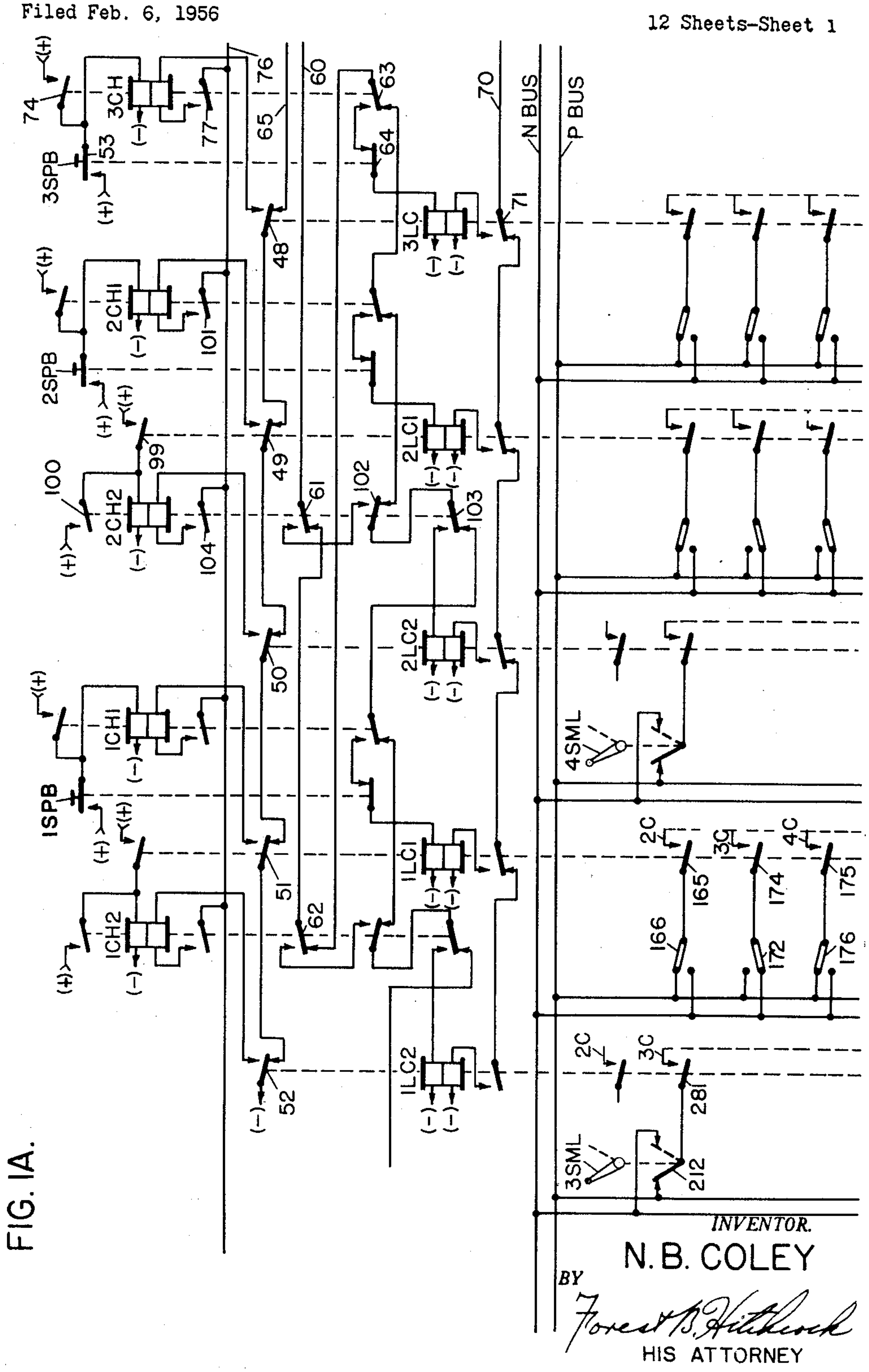
FIG. IA.
INVENTOR.
N. B. COLEY
BY Forest B. Hitchcock
HIS ATTORNEY Sept. 20, 1960 N. B. COLEY 2,953,772

CODE COMMUNICATION SYSTEM

Filed Feb. 6, 1956

12 Sheets-Sheet 2

INVENTOR.

N.B. COLEY

BY Forest B. Hitchcock

HIS ATTORNEY

CODE COMMUNICATION SYSTEM

Filed Feb. 6, 1956 12 Sheets-Sheet 3

INVENTOR.
N. B. COLEY
BY Forest B. Hitchcock
HIS ATTORNEY

INVENTOR.
N. B. COLEY
BY
Forest B. Hitchcock
HIS ATTORNEY

Sept. 20, 1960 N. B. COLEY 2,953,772
CODE COMMUNICATION SYSTEM
Filed Feb. 6, 1956 12 Sheets-Sheet 5
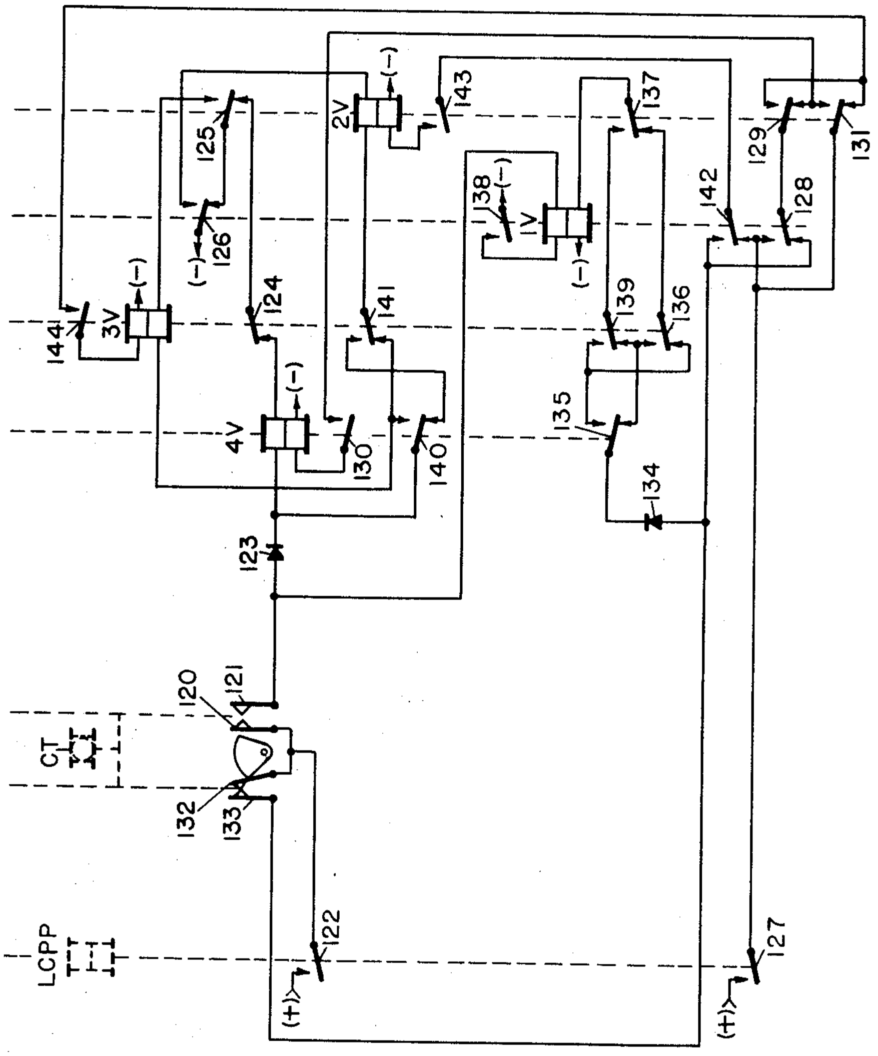
FIG. IE.
INVENTOR.
N. B. COLEY
BY Forest B. Hitchcock
HIS ATTORNEY Sept. 20, 1960 N. B. COLEY 2,953,772

CODE COMMUNICATION SYSTEM

Filed Feb. 6, 1956 12 Sheets-Sheet 6

FIELD STATION-STA. CODE + - +

INVENTOR.
N.B. COLEY
BY Forest B. Hitchcock
HIS ATTORNEY

INVENTOR.
N. B. COLEY
BY Forest B. Hitchcock
HIS ATTORNEY

Sept. 20, 1960 N. B. COLEY 2,953,772

CODE COMMUNICATION SYSTEM

Filed Feb. 6, 1956 12 Sheets-Sheet 8

INVENTOR.
N. B. COLEY
BY Forest B. Hitchcock
HIS ATTORNEY

INVENTOR.
N.B. COLEY
BY Forest B. Hitchcock
HIS ATTORNEY

CODE COMMUNICATION SYSTEM

INVENTOR.
N.B.COLEY
BY Forest B. Hitchcock
HIS ATTORNEY

Sept. 20, 1960 N. B. COLEY 2,953,772

CODE COMMUNICATION SYSTEM

Filed Feb. 6, 1956 12 Sheets-Sheet 11

INVENTOR.
N. B. COLEY
BY Forest B. Hitchcock
HIS ATTORNEY

Sept. 20, 1960 N. B. COLEY 2,953,772

CODE COMMUNICATION SYSTEM

Filed Feb. 6, 1956

12 Sheets-Sheet 12

INVENTOR.
N.B.COLEY
BY Forest B. Hitchcock
HIS ATTORNEY 2,953,772
Patented Sept. 20, 1960

2,953,772

CODE COMMUNICATION SYSTEM

Nelson B. Coley, Rochester, N.Y., assignor to General Railway Signal Company, Rochester, N.Y.

Filed Feb. 6, 1956, Ser. No. 563,637
10 Claims. (Cl. 340—147)

This invention relates to code communication systems, and it more particularly pertains to such systems for the remote control from a control office of railway track switches and signals located at different remotely spaced field stations.

The system according to the present invention provides a normally at rest code communication system effective when initiated into a cycle of operation to transmit a series of code elements from the control office to the field stations, the elements being of equal duration and distinctive because of being of two different frequencies if carrier currents are used for line circuit communication, or these elements may be distinctive by being selected positive and negative characters if direct current line circuit energization is used. For convenience in the description of the present invention, the code characters transmitted will be referred to as plus and minus characters for the respective elements of the codes transmitted.

The duration of the rspective steps during which the code elements are transmitted from the control office to the field stations is determined by local normally inactive free-running oscillatory timers which close two sets of contacts alternately to drive a "Gray code" binary counter in which a bank of relays operates through all of its permutations, there being only a single relay operation during each step in response to the actuation of contacts of an associated oscillatory timing device.

The code elements are transmitted over a single integral communication channel that may also be used for other purposes independently, such as for telephone comunication. Where the respective successive elements of a code are not changed in character, there is no interruption of energization of the communication channel during the transmission of these elements, and where the character of the code elements is changed, there is generally only a momentary "off" period between the code elements.

One of the problems in the use of a code communication system of this nature in centralized traffic control for railroads is that the number of different devices to be controlled at the different remotely spaced field stations may vary considerably. Rather than increase the number of relays in the binary counter at each station and thus lengthen each cycle of operation of the communication system in order to accommodate the station having the greatest number of different controls to be transmitted, it is provided that the system normally operates quickly through relatively short cycles of operation for the transmission of controls to the different field stations; and for stations having a greater number of devices to be controlled, a second cycle of operation is automatically transmitted immediately following a first cycle that is transmitted to that station. This automatic initiation of a second cycle is provided in the initiating and storage circuit organization at the control office wherein priority over all stored starts is always given for transmission of a second cycle for a two-cycle station immediately following the transmission of a first cycle for the associated station, irrespective of starts that may be stored for other field stations.

The second cycle of operation differs from the first cycle in that no station code need be transmitted during the second cycle. This is true because a station relay for the two-cycle station called is picked up during the first cycle and is maintained energized until the end of the second cycle. The system is so organized that no station relay can be picked up during the above characterized second cycle of operation even though the code received at some other field station may correspond to the station code assigned to that station. This is because of the transmission of an "off" period during the second step of the second cycle which drops out the station selection relays at all other stations and thus renders these stations nonresponsive to the control codes which follow this "off" period.

The system is so organized that in case of a failure of the apparatus at any station to properly complete its operation during a communication cycle, a cutout relay is automatically picked up; the picking up of this relay resets the receiving apparatus at the associated station so that it is not left in a locked up position; and the control intended for that station can be retransmitted.

An object of the present invention is to reduce to a minimum the amount of apparatus required for communication of controls from a control office to devices at remotely spaced field stations.

Another object of the present invention is to provide for single cycle operation for transmission from the control office to some field stations and to provide for double cycle operation when transmitting from the control office to other field stations.

Another object of the present invention is to provide a normally deenergized clearout relay at each of the field stations that becomes picked up to clear out the apparatus at the associated station when and only when an abnormal operating condition exists at that associated station.

Other objects, purposes and characteristic features of the present invention will be in part obvious from the accompanying drawings and in part pointed out as the description of the invention progresses.

In describing the invention in detail, reference is made to the accompanying drawings, in which corresponding parts are designated by like reference characters, in which similar parts having similar functions are designated by like letter reference characters, succeeding numerals being used in some cases as indicative of designation of a distinctive location or station with which the apparatus is associated, and in which:

Figs. 1A and 1B when placed one above the other and to the left of Figs. 1C and 1D, respectively, illustrate initiating and code communication means provided at the control office for the transmission of codes. Fig. 1E illustrates the circuits for a binary stepper used at the control office, and this figure may be considered as being disposed below Fig. 1D;

Figs. 2A, 2B and 2C when placed one above the other illustrate code receiving means at a typical field station for the reception of codes transmitted from the control office;

Figure 5:
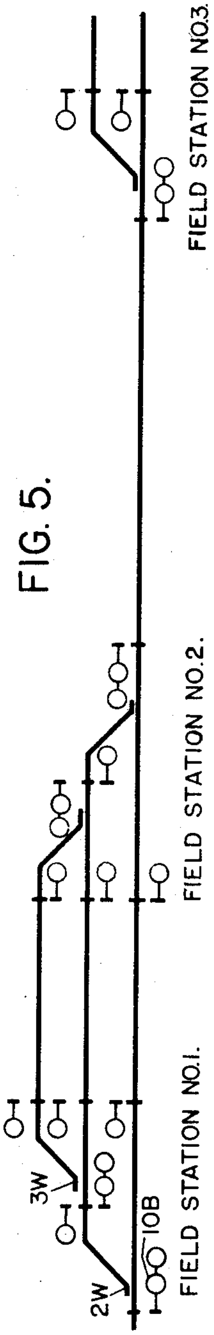
Figure 6A:
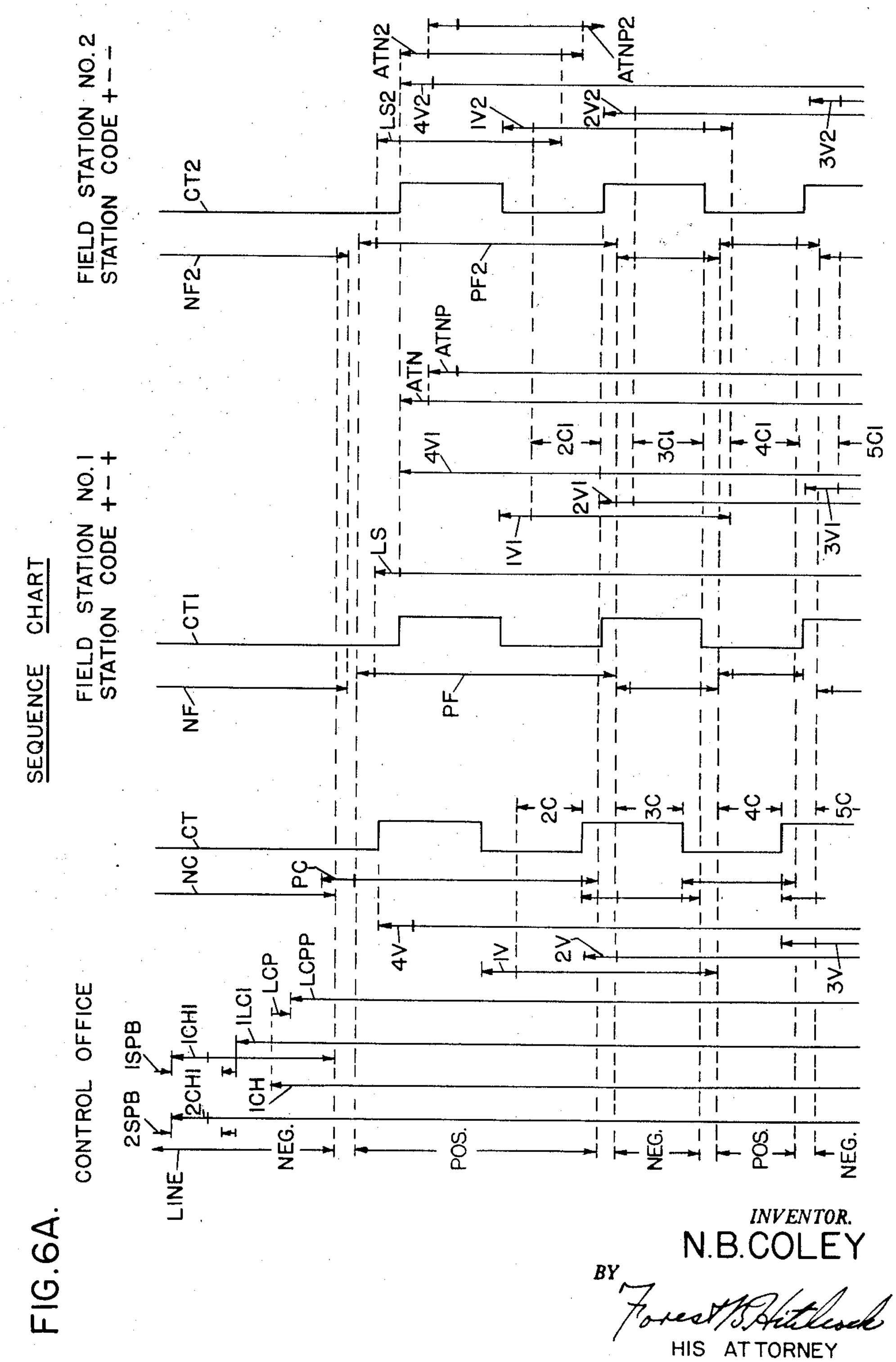
Figure 6B:
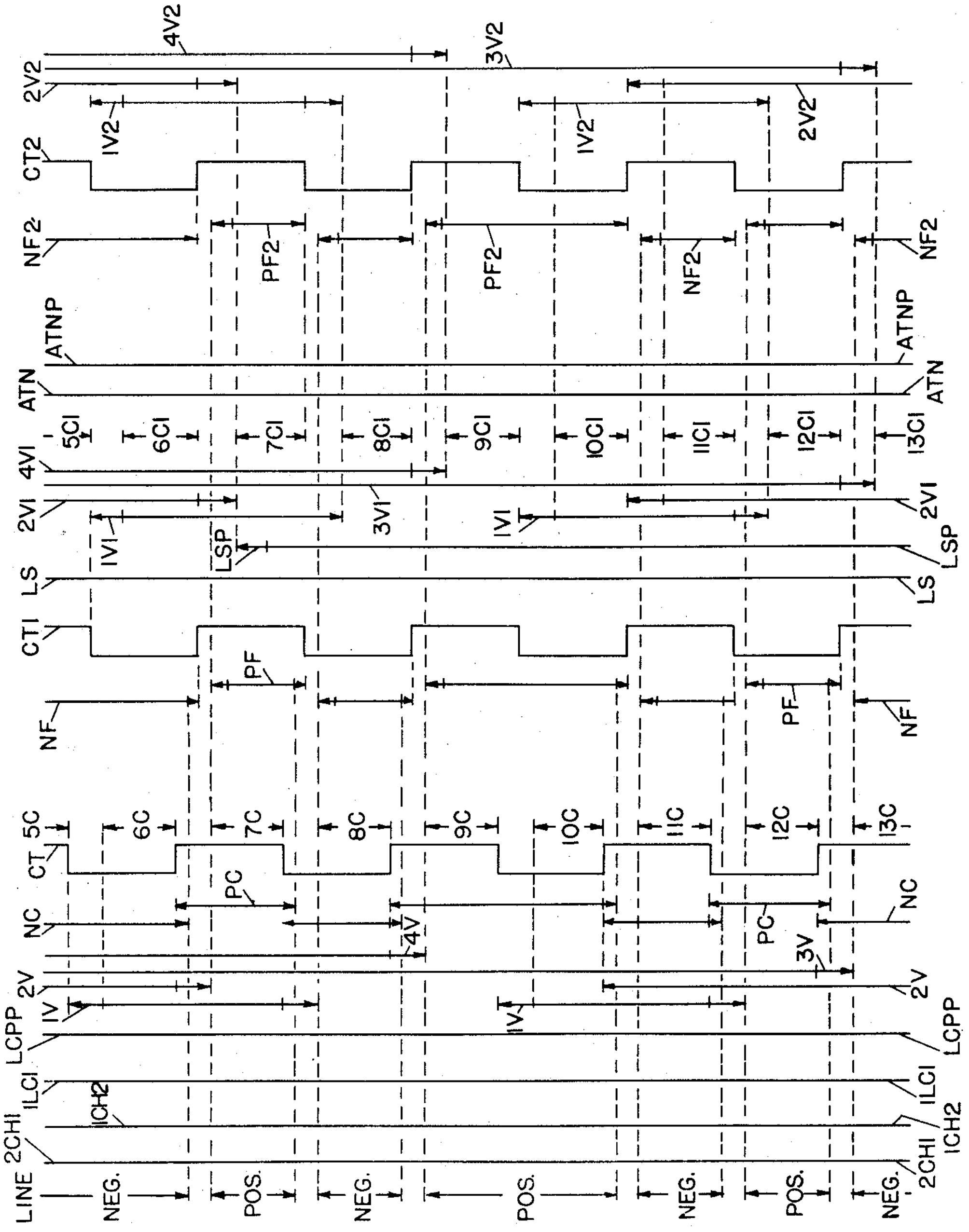
Figure 6C:
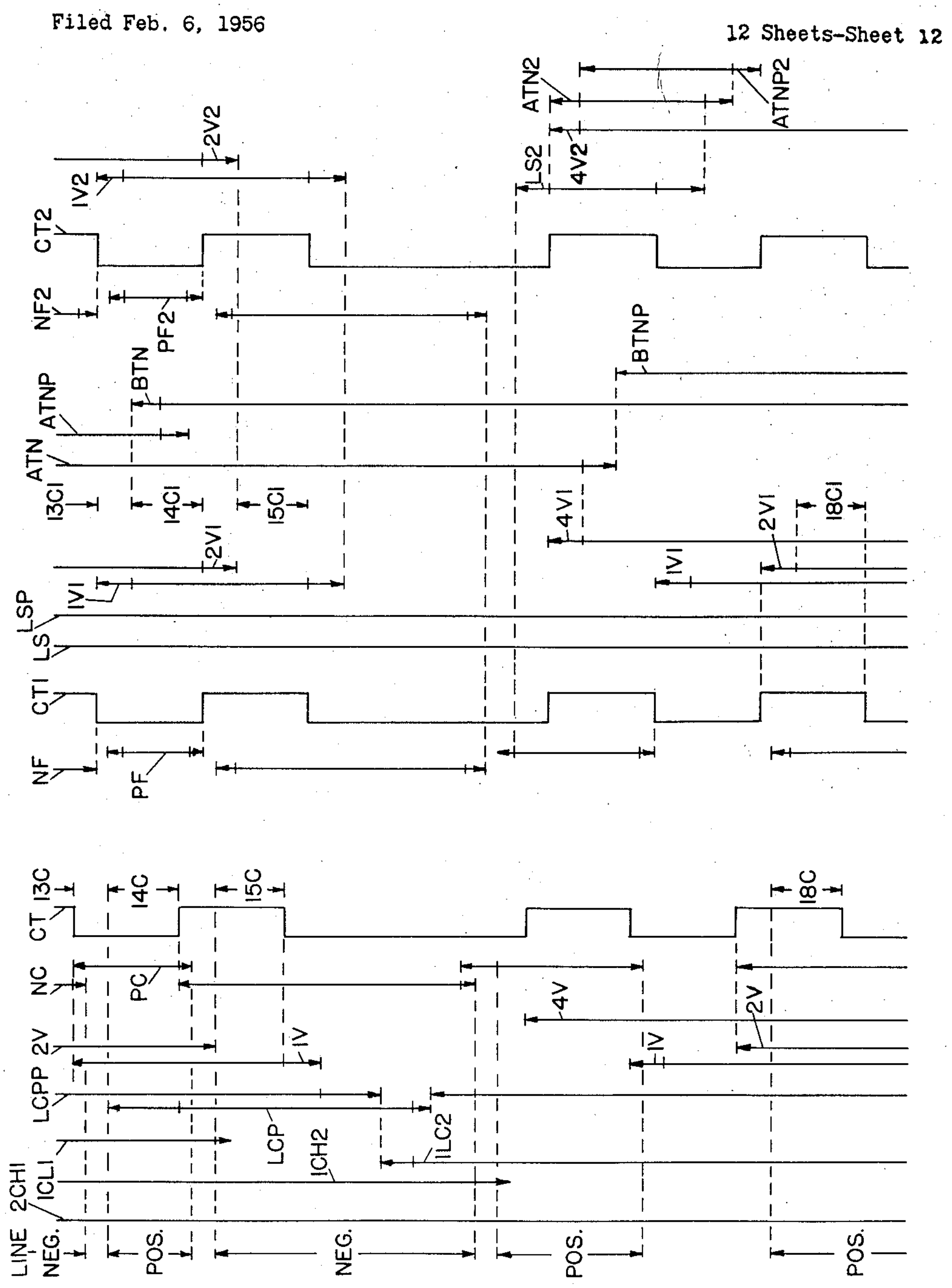

Fig. 5 illustrated a section of trackway for which the code communication system according to this embodiment of the present invention is provided; and, Figs. 6A, 6B and 6C when disposed one above the other, respectively, show a sequence chart illustrating the operation of the different relays of the system during a typical first cycle of operation and during the initiation of a second cycle of operation.

For the purpose of simplifying the illustrations and facilitating in the explanation thereof, the various parts and circuits constituting this embodiment of the present invention have been shown diagrammatically by conventional schematic diagrams in an arrangement to more particularly facilitate an understanding of the mode of operation of the system, rather than to attempt to point out all of the necessary details of constructions and the specific arrangement of components that may be provided by those skilled in the art in accordance with the requirements of practice. The symbols (+) and (—) have been used to indicate connections to the respective positive and negative terminals of suitable batteries or other sources of direct current, and the symbols (B+) and (B—) are used to indicate the respective positive and negative terminals of a battery having a center tap (CN).

In the description of the present invention, a control cycle of operation is the term applied to a cycle of operation of the code communication system for the transmission of a control code from the control office to the field stations comprising selected (+) and (—) code characters, at the end of which cycle the system is restored to its normally at rest condition. Thus, each cycle of operation of the communication system is initiated from a period of rest of the code communication apparatus into a first step period. During this first step period, the communication channel is energized with a different polarity or frequency from that applied when the system is at rest. Following the first step period, successive steps are taken, one code element being communicated during each step, until all steps have been taken.

Although it is to be understood that the present invention is readily adaptable for the communication of practically any number of switch and signal controls, or controls for other devices, from a control office to a plurality of remote field stations for a track layout having a relatively large number of track switches and signals or other devices to be controlled, for the purpose of simplification of this embodiment of the present invention, only a portion of the track layout is illustrated in Fig. 5, and only typical switch and signal controls are illustrated as being transmitted from the control office to this track layout. In the track layout illustrated in Fig. 5, the switches and signals to be controlled are divided into three remotely spaced groups having associated therewith field stations Nos. 1, 2 and 3 respectively.

It will be noted that a larger number of track switches and signals are provided at field stations Nos. 1 and 2, and thus it is assumed that it is necessary to provide two cycles for communication of controls to each of these field stations. The field station No. 3 is assumed to be a station having a smaller number of track switches and signals such as to require only a single cycle of operation of code communication apparatus for the control of the devices at this station. In actual practice, there would no doubt be a greater number of devices to be controlled at each of the stations Nos. 1 and 2, but for purposes of simplification of the present disclosure, only typical controls for both first and second cycles of operation are shown and described.

It is to be understood that the system inculdes a suitable centralized traffic control machine (not shown), such as is well known in the art, for use at the control office in governing traffic through the track layout for which the system is provided. This machine has a suitable control panel (not shown) having a track diagram constructed thereon with suitable indicator lamps being disposed along the trackway of the diagram for keeping an operator informed of the positions of the trains and of the conditions of the track switches and signals. Inasmuch as the present application is more particularly concerned with the communication of controls for the switches and signals, for the purpose of simplification of the present disclosure, the indication communication apparatus is not herein disclosed but it is to be understood that this apparatus can be provided in any suitable manner, such as by the use of indication communication apparatus disclosed in the prior U.S. application of H. C. Sibley, Ser. No. 485,973, filed February 3, 1955.

Figure 1B:
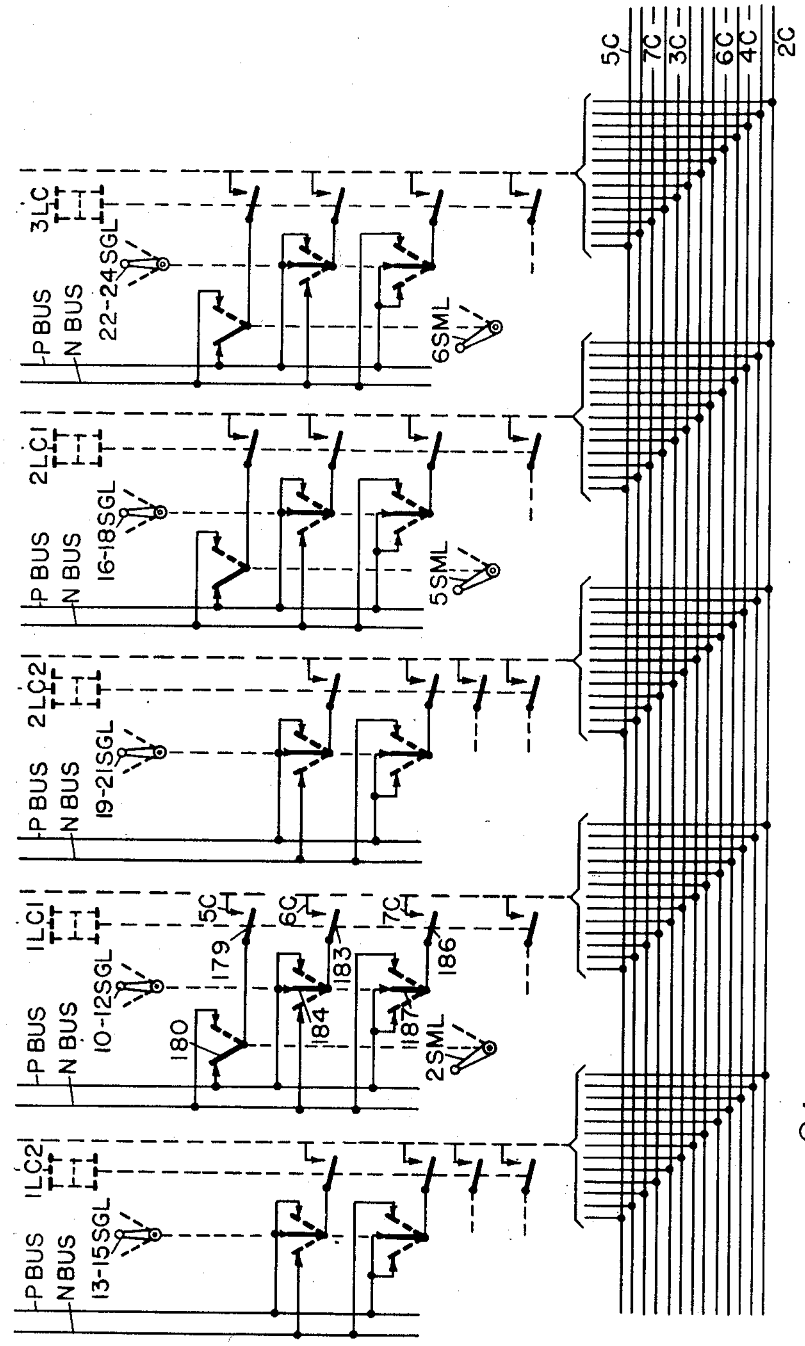

Also disposed on the control panel, either directly on the track diagram or below the track diagram, in accordance with the requirements of practice, are suitable control levers or buttons for designation of the desired switch and signal controls for the respective track switches and signals of the track layout. Thus for example, with reference to Fig. 1B, a switch control lever 2SML is provided for the control of the track switch 2W (see Fig. 5), and a three-position signal control lever 10–12SGL is provided for controlling the clearing of the signals governing traffic through the track switch 3W in both directions. The lever 2SML is a two-position lever, the left-hand position as shown in Fig. 1B being used for governing the power operation of the track switch 2W to its normal position, and the right-hand position of the lever 2SML being used for governing the power operation of the track switch 2W to its reverse position. The three-position signal control lever 10–12SGL has its center position used for putting the associated signals to stop, its left-hand position for the clearing of a signal governing westbound traffic, and its right-hand position being used for the clearing of a signal governing eastbound traffic. It is to be understood that these switch and signal control levers may be replaced by other types of manually operable switches, or by relays, or by push buttons, or any other suitable means desired to be employed in practice for the designation of the controls that are to be transmitted for the control of the respective track switches and signals.

Although different types of timing devices may be used for governing the rate of operation of the stepping, a timing device CT of the oscillatory pendulum type is assumed to be provided at the control office and at each of the field stations. The structure of this timing device can be as disclosed, for example, in my prior U.S. Patent No. 2,626,382, dated January 20, 1953. These oscillators CT are normally energized when the system is at rest, locking the mechanism against operation and upon initiation of the system into a cycle of operation, the oscillators are all deenergized to initiate a cycle of free torsional oscillations or excursions of the pendulums of the respective devices. The oscillations of the oscillator CT are in accordance with the characteristics of torsional involute springs associated with the respective pendulums. The oscillators CT close different sets of contacts alternately upon rotation through their respective center positions, the opening and closing of contacts taking place only in substantially the center positions of the oscillatory operation in order to obtain accurately measured time intervals for the respective steps throughout an entire cycle of operation. Thus, the reduction in travel of the pendulum during the successive excursions has relatively no effect upon the rate of stepping.

The field stations and the control office are connected by a single line circuit which will be hereinafter more specifically considered when considering the mode of operation of the system. The line circuit need not be provided specifically for the centralized traffic control system, but the controls communicated in this system can be superimposed upon a telephone line circuit, or any other suitable communication channel may be used to connect the control office to the field stations.

At the control office, a change and storage relay CH (see Fig. 1A) and a code determining relay LC is provided for each of the field stations, two of each of these relays being provided for each of the field stations for which double cycle operation is provided.

Associated with the control of the relays CH and LC are the relays LCP (see Fig. 1C) and LCPP which serve to prevent the interruption of a cycle of operation by the designation of controls for transmission at a time when the system is in use for the transmission of prior designated controls.

Respective positive and negative code element transmitting relays PC and NC are provided at the control office for the transmission of the respective code elements selected for transmission by the selective energization of the relays LC.

A bank of stepping relays 1V, 2V, 3V and 4V is provided at each of the stations for counting the respective code characters communicated during the respective cycles of operation of the communication system. This bank of stepping relays operates through all of the 16 different permutations of the relays, only one relay operating during a single counting step. Thus, some of the steps are initiated by the picking up of one of the counting relays and other steps are initiated by the dropping away of one of the counting relays.

Figure 2A:
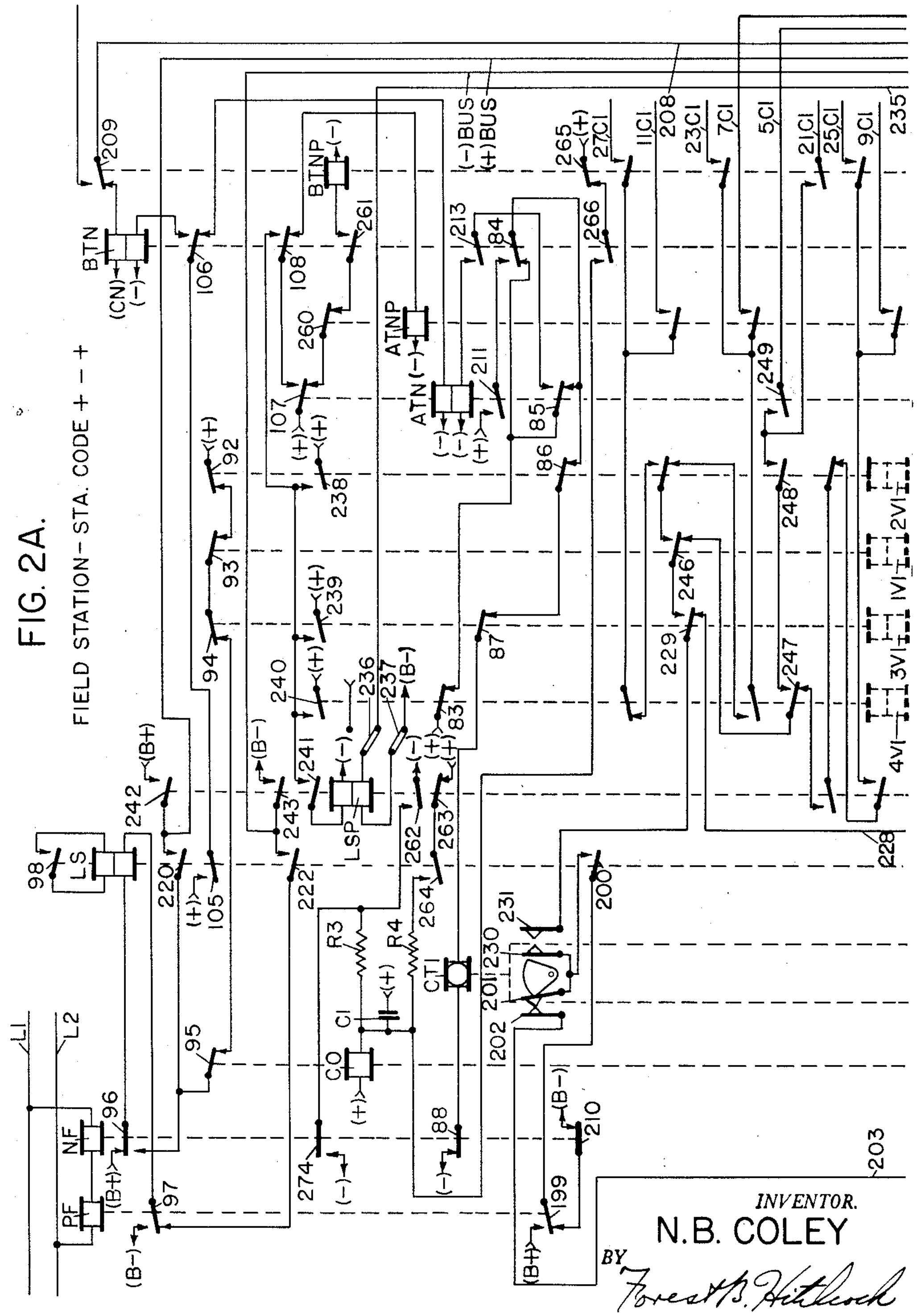

Each of the field stations has quick-acting line relays PF and NF connected across the line circuit. These relays are preferably of the bias polar type, and are connected in series as illustrated in Fig. 2A at each of the field stations in polarity opposition to each other so that the relay PF responds to positive code elements and the relay NF responds to negative code elements.

Relays LS and LSP are provided at the respective field stations for the purpose of station selection. These relays are so organized that a relay LSP is picked up in response to a station code transmitted during the first part of a cycle of operation, only provided the station code received corresponds to the station code assigned to the associated field station.

A cut-out relay CO is provided at each of the field stations for the purpose of resetting the apparatus at the associated field station in case of an abnormal condition of operation wherein the apparatus at the associated field station fails to complete a cycle of operation. This relay is normally deenergized, and it becomes picked up only under an abnormal condition of operation.

Having thus considered the organization of the system in general, a consideration in detail as to the circuits involved for the control of the respective relays will be hereinafter given when considering the mode of operation of the system under typical operating conditions.

OPERATION

Before considering specifically the circuit organization and mode of operation during typical conditions, it is believed expedient to consider the mode of operation in general with reference to the sequence chart of Fig. 6 and without specific reference to the circuits involved in such operation.

If it is desired to transmit controls to a particular field station to change the position of a track switch and/or a signal, the operator of the control machine first operates the control levers SML (see Figs. 1A and 1B) and SGL as required for designating the desired controls. He then operates a start button SPB for the associated field station. In accordance with the actuation of this start button SPB, a change relay CH for the associated station is picked up, and upon restoration of the start button SPB to its normal condition, a relay LC becomes picked up to determine the code for transmission during the cycle of operation. The picking up of this relay in turn causes relay LCP to be dropped away, and the dropping away of this relay effects the picking up of relay LCPP. This relay when picked up is maintained energized throughout the cycle of operation. The picking up of relay LCPP causes the pole changing of the line circuit by the deenergization of relay NC and the energization of relay PC.

The oscillators CT at the respective stations are all initiated upon the termination of the normal condition of energization of the line circuit, the oscillator CT at the control office being initiated slightly before this time because of being deenergized upon the picking up of relay LCPP.

When the pendulum of each of the oscillators CT rotates through center for the first time, one set of contacts is opened and another set of contacts is closed. For convenience in describing the mode of operation involving these sets of contacts, the contacts are called left and right contacts respectively in accordance with their relative location with respect to each other as illustrated in the drawings including the sequence chart of Fig. 6.

The binary counter having relays 1V through 4V (see Fig. 1E) at the control office and at each of the field stations is actuated each time that there is a shift in the contacts of the oscillator CT at the associated station. The mode of operation of the relays V is best understood with reference to the sequence chart of Fig. 6 wher it is shown that relays 3V and 4V are picked up only once during a cycle of operation, while relay 2V is picked up twice and relay 1V is picked up four times. The times of picking up of these relays are all different, thus marking the beginning of eight different steps when they are picked up, and similarly, these relays are dropped away at different times in response to the shifting of the contacts of the associated oscillator CT, thus forming eight additional steps when they become dropped away.

A positive character is always transmitted from the control office during the first step upon initiation of a cycle for the purpose of picking up the station selecting relays LS at all of the field stations.

The series of code elements next following the positive element transmitted during the first step constitutes a station selection code. The code is selected at the control office for transmission in accordance with the station for which the designated controls are intended. The relays LS at the respective field stations are maintained picked up during reception of the station code only so long as the code received corresponds to the code assigned to the associated station. Upon reception of the last element of the station code, a relay LSP is picked up at the station being called and is maintained picked up, together with the associated relay LS until the end of the cycle of operation. This relay LSP must be picked up in order that devices at the associated station may be controlled in accordance with the codes received during the remainder of the cycle.

The code elements for the remainder of the cycle are for the control of devices at the station selected. The other field stations will continue their stepping operations to the end of the cycle but will be nonresponsive to these codes. At the end of the cycle of operation, the apparatus is restored to its normal condition, and the communication channel connecting the stations is restored to its condition of negative energization.

The above described mode of operation is general for all field stations, but in addition, for some of the field stations, it is provided that a second cycle of operation will be automatically transmitted. This condition is illustrated in the sequence chart of Fig. 6 in which operating conditions are illustrated for two field stations that are adapted for double cycle operation. Operation during the first cycle is as has been described above, except that additional relays ATN and ATNP are picked up during the first step and are maintained picked up throughout the cycle provided that the associated station is selected to receive the control codes that are to be transmitted. In case a field station is not selected to receive the control codes, the relays ATN and ATNP at that station become deenergized upon a detection of lack of correspondence with the station code transmitted as detected by the relay LS.

At a two-cycle station that has been called, a relay BTN is picked up during the 14th step of the first cycle, and the picking up of this relay provides a stick circuit to maintain the relays LS and LSP picked up at the associated station during the time interval involved in the initiation of a second cycle. In other words, for two successive cycles to be transmitted to a particular station, the relays LS and LSP at that station are maintained picked up until the end of the second cycle, thus making it unnecessary to retransmit the station selection code for the second cycle of operation. Aside from this abnormal condition, the apparatus goes through cycle termination and initiation periods in going from the first to the second cycle according to normal operation so that the code oscillators CT are momentarily energized, and thus are effectively wound up prior to their free running operation during the second cycle of operation.

In order to prevent any field station not being called from responding to a code transmitted during the first part of the second cycle in case the control code transmitted should correspond to the station code for that station, a period of deenergization of the code communication channel during the second step is provided. In accordance with this period of deenergization all of the station selection relays LS for the stations other than the station that has been selected are all dropped away, thus insuring that only one station will be responsive to the control codes that are transmitted during the second cycle of operation. The station relays LS and LSP at the station for which the cycle is intended are maintained energized during the period of deenergization by reason of relays ATN and BTN being in their energized position at this time.

*Normal-at-rest conditions*

Figure 1C:
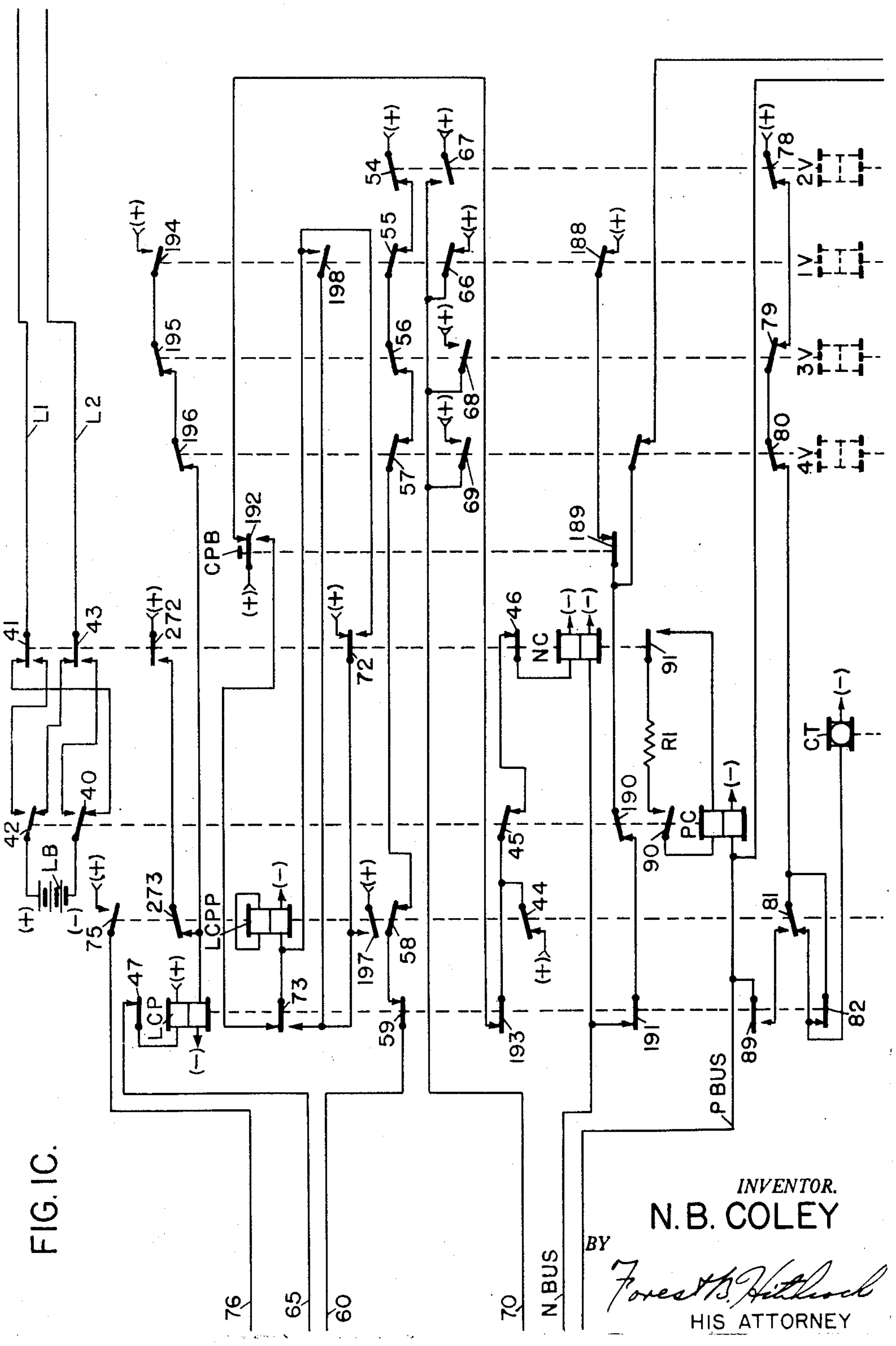

When the system is at rest, the line circuit is maintained energized with a negative polarity in accordance with the relay NC (see Fig. 1C) at the control office being maintained in its picked up condition. This negative energization of the line circuit is particularly to prevent the possibility of the erroneous initiation of the system into a cycle of operation by the occurrence of a pulse in the line circuit from an extraneous source. For the purpose of description of the invention, the polarity of energization of the line circuit will be assumed to be in accordance with the particular (+) or (−) terminal of the line battery LB that is connected to the upper line wire L1 as illustrated in Fig. 1C and in Figs. 3 and 4. With reference to Fig. 1C, the negative terminal of the line battery LB is applied to the upper line wire L1 through back contact 40 of relay PC and front contact 41 of relay NC. The positive terminal of the line battery LB is connected to the line wire L2 through back contact 42 of relay PC and front contact 43 of relay NC.

Figure 3:
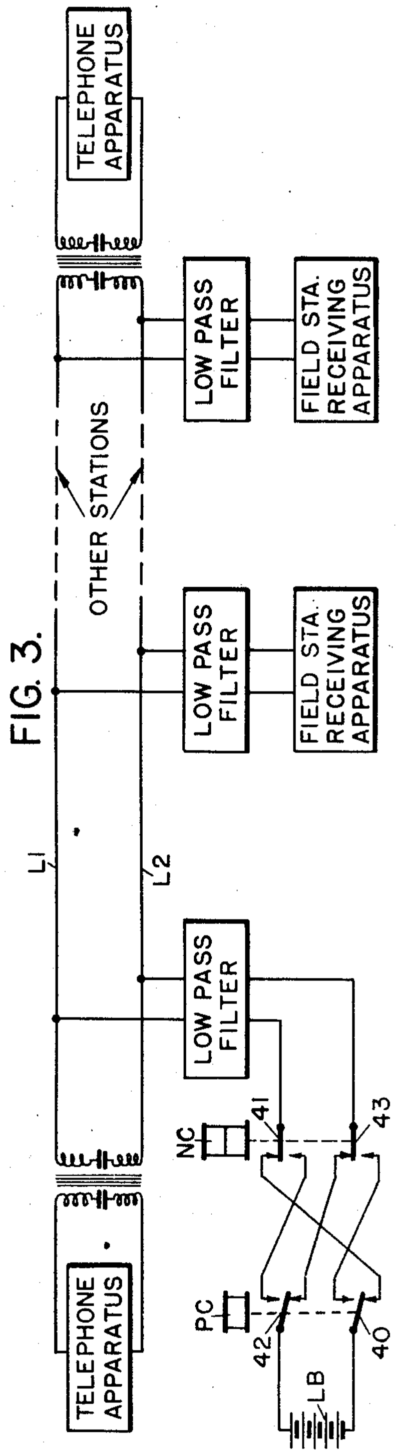
Fig. 3 illustrates a telephone line circuit upon which the code communication system of the present invention may be superimposed.

In case the line circuit is used for other purposes as is illustrated in Fig. 3, a low-pass filter is included in the connection to the line wires in order to effectively isolate the telephone communication energy from the code communication apparatus.

The relay NC (see Fig. 1C) at the control office is normally maintained picked up by the energization of a stick circuit extending from (+), including back contact 44 of relay LCPP, back contact 45 of relay PC, front contact 46 of relay NC, and upper winding of relay NC, to (−).

Relay LCP at the control office is also normally maintained in its picked up position when the system is at rest by the energization of its stick circuit extending from (+), including upper winding of relay LCP, front contact 47 of relay LCP, wire 65, back contact 48 of relay 3LC, back contact 49 of relay 2LC1, back contact 50 of relay 2LC2, back contact 51 of relay 1LC1, and back contact 52 of relay 1LC2, to (−).

Figure 2B:
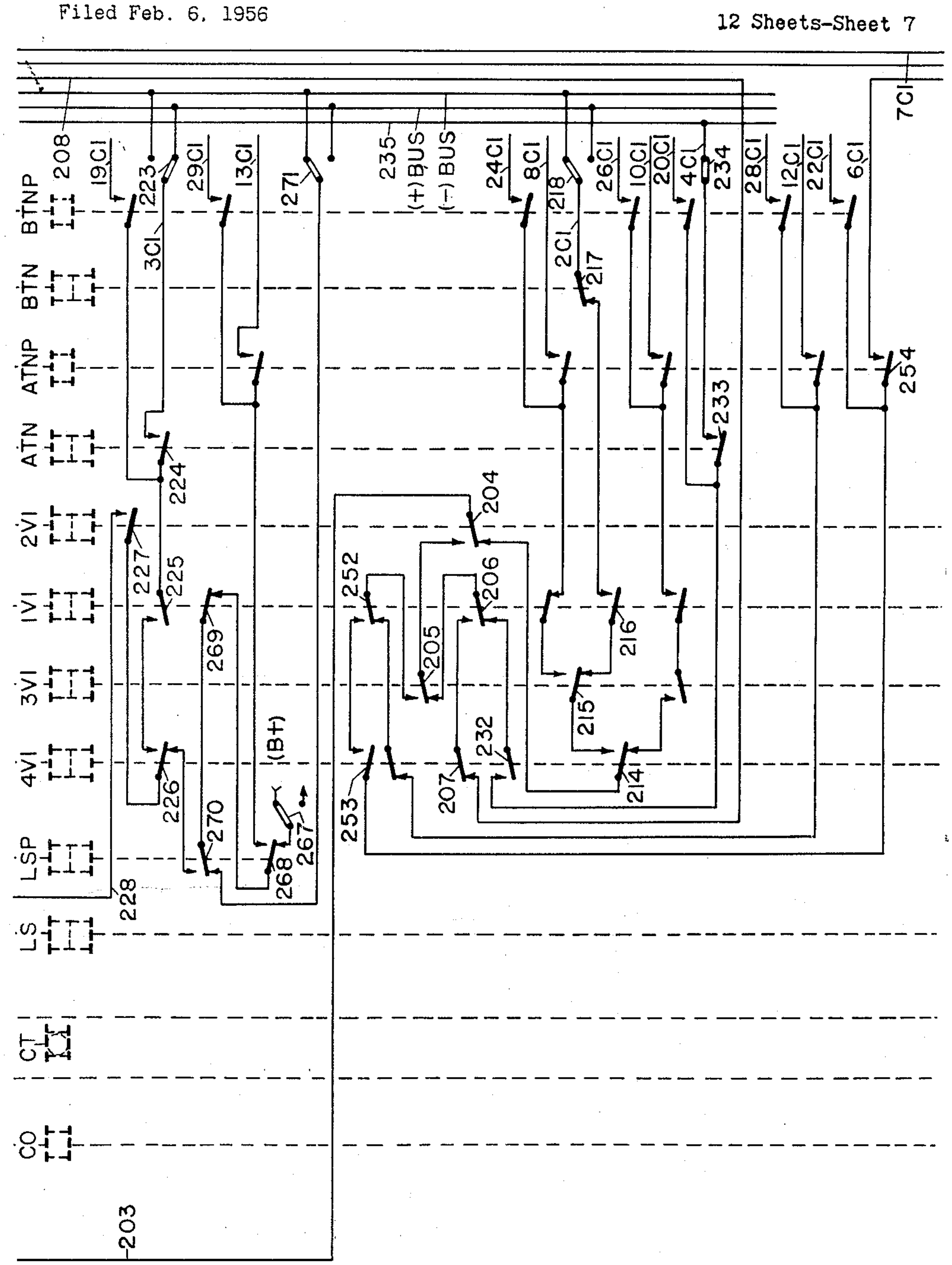
Figure 2C:
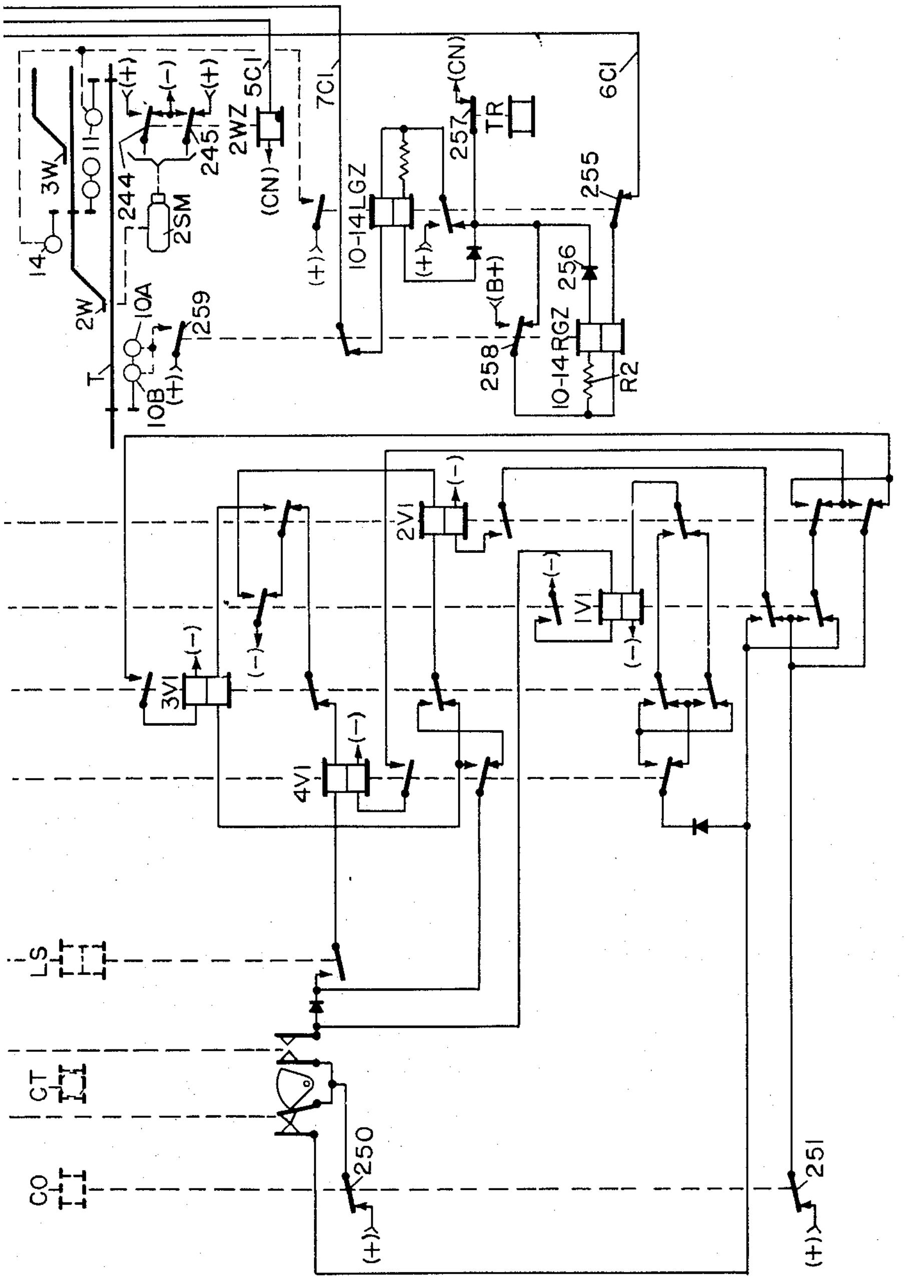

Oscillator CT at the control office is normally energized by a circuit extending from (+), including back contact 78 of relay 2V, back contact 79 of relay 3V, back contact 80 of relay 4V, back contact 81 of relay LCPP connected in multiple with front contact 82 of relay LCP, and winding of oscillator CT, to (−). Similarly, at the field stations, the oscillators CT are maintained energized. The relay CT1 for the field station illustrated in Figs. 2A, 2B and 2C is energized by a circuit extending from (+), including back contact 83 of relay 4V1, back contact 84 of relay BTN connected in multiple with back contact 85 of relay ATN, back contact 86 of relay 2V1, back contact 87 of relay 3V1, winding of oscillator CT1 and front contact 88 of relay NF, to (−).

All of the other code communication relays at the control office are normally deenergized, and all of the code communication relays at the field stations (see Figs. 2A, 2B and 2C) except for the line relay NF (see Fig. 2A) which is energized in accordance with the negative polarity of energization of the line circuit.

*Cycle initiation*

When an operator of the control machine at the control office desires new switch and signal controls to be transmitted to any particular field station, he actuates the respective switch and signal control levers SML and SGL (see Figs. 1A and 1B) to positions to correspond with the desired controls to be transmitted, and then actuates the start button SPB associated with the corresponding field stations.

To consider initiation under a typical specific condition, it will be assumed that the operator desires to transmit controls selected by the respective switch and signal control levers 6SML and 22–24SGL to the associated field station. After having positioned these levers, the start button 3SPB (see Fig. 1A) for the associated field station is actuated. The actuation of this button causes the picking up of relay 3CH by the energization of its upper winding through contact 53 of button 3SPB.

After restoration of the push button 3SPB to its normal position, subsequent to its actuation, relay 3LC becomes picked up by the energization of a circuit extending from (+), including back contacts 54, 55, 56, 57 and 58 of relays 2V, 1V, 3V, 4V and LCPP respectively (see Fig. 1C), front contact 59 of relay LCP, wire 60, back contact 61 of relay 2CH2, back contact 62 of relay 1CH2, front contact 63 of relay 3CH, normally closed contact 64 of push button 3SPB and upper winding of relay 3LC, to (−). Upon the picking up of relay 3LC, this relay is maintained picked up until the end of the cycle by a stick circuit for energization of its lower winding including back contact 66 of relay 1V (see Fig. 1C) connected in multiple with front contacts 67, 68 and 69 of relays 2V, 3V and 4V, respectively, wire 70, and front contact 71 of relay 3LC.

The picking up of relay 3LC opens the stick circuit that has been described for normally maintaining relay LCP (see Fig. 1C) picked up at back contact 48 and thus relay LCP becomes dropped away. The dropping away of this relay closes a pick up circuit for relay LCPP. This circuit extends from (+), including front contact 72 of relay NC, back contact 73 of relay LCP and lower winding of relay LCPP, to (−).

Relay 3CH (see Fig. 1A) has been maintained energized subsequent to its being picked up by a stick circuit for its upper winding including front contact 74. This relay becomes dropped away after the picking up of relay 3LC has been effected in accordance with closure of a circuit for energizing its lower winding with reverse polarity upon the picking up of relay LCPP. This circuit extends from (+), including front contact 75 of relay LCPP (see Fig. 1A), wire 76, front contact 77 of relay 3CH, lower winding of relay 3CH, front contact 48 of relay 3LC, back contacts 49, 50, 51 and 52 of relays 2LC1, 2LC2, 1LC1 and 1LC2, respectively, to (−). The picking up of relay LCPP initiates operation of the oscillator CT at the control office by the deenergization of its winding upon the opening of back contact 81.

Initiation of the oscillators CT at the respective field stations is accomplished in accordance with the dropping away of the line relay NF at the associated station. This initiation is accomplished at a typical one of the field stations as illustrated in Fig. 2A by the opening of front contact 88 in the circuit for the oscillator CT1.

At the control office, the picking up of relay LCPP (see Fig. 1C) causes the picking up of the relay PC for the energization of the line circuit with a positive polarity. The circuit by which relay PC is picked up at this time extends from (+), including back contacts 78, 79 and 80 of relays 2V, 3V and 4V, respectively, front contact 81 of relay LCPP, back contact 89 of relay LCP and lower winding of relay PC, to (−). When this relay is picked up, a circuit is closed shunting its upper winding through front contact 90 of relay PC, resistor R1, and back contact 91 of relay NC so as to make this relay slightly slow in dropping away. The picking up of relay PC pole changes the connection of the line battery LB to the line wires L1 and L2 by the shifting of its contacts 40 and 42.

The detection of the positive polarity of energization of the line circuit at the respective field stations by the associated line relays PF becoming picked up picks up the station selecting relays LS at the associated field stations. Thus, the relay LS of Fig. 2A is picked up at this time by the energization of a circuit extending from (+), including back contacts 92, 93, 94, 95 and 96 of relays 2V1, 1V1, 3V1, CO and NF respectively, lower winding of relay LS, and front contact 97 of relay PF, to (−). Relay LS is made slightly slow in dropping away by the shunting of its upper winding through front contact 98.

The initiation that has been described has been initiation provided for the transmission of a cycle of operation for the transmission of controls to a single cycle station.

To consider how initiation of the system is effective for the transmission of controls to a two-cycle station, it will be assumed that while the system is at rest, an operator actuates the start button 2SPB (see Fig. 1A) after he has positioned the switch and signal control levers for the associated field station in accordance with controls to be transmitted. Relay 2CH1 is picked up in response to the actuation of this button in the same manner as has been described for the energization of the relay 3CH in response to the actuation of push button 3SPB, and the mode of operation in picking up the associated relay 2LC1 and in the operation of relays LCP and LCPP and the initiation of the oscillator CT and the pole changing of the line circuit is accomplished as has been described when considering operations effective in response to the actuation of the start button 3SPB.

In addition to these relay operations that are common for both single and double cycle transmission, the relay 2CH2 is automatically picked up in accordance with the picking up of the relay 2LC1 at the beginning of the first cycle upon the closure of front contact 99. This relay when picked up is maintained picked up by a stick circuit for its upper winding extending through front contact 100 of relay 2CH2. Relay 2CH1 is knocked down after relay LCPP has become picked up by the energization of a circuit for its lower winding extending from (+), including front contact 75 of relay LCPP (see Fig. 1C), wire 76, front contact 101 of relay 2CH1, lower winding of relay 2CH1, front contact 49 of relay 2LC1, and back contacts 50, 51 and 52 of relays 2LC2, 1LC1, and 1LC2, respectively. It will be readily apparent that the relay 2CH2 cannot be knocked down at this time because its circuit is opened at front contact 50 of relay 2LC2 and this relay cannot be picked up until after the completion of the transmission of the first cycle. This is true because the pick up circuit for relay 2LC2 is open at this time at front contact 59 of relay LCP. It will be thus apparent that the first cycle of operation can be initiated, and during its initiation the relay 2CH2 has been picked up to store an automatic start for a second cycle, but such start cannot become effective until complete restoration at the control office has taken place at the end of the first cycle.

According to the sequence chart of Fig. 6, the last relay operation during a cycle is the dropping away of the relay LCPP, and the dropping away of this relay, upon closure of back contact 58 is effective to establish a pick up circuit (under the above assumed condition) for the picking up of relay 2LC2 for the initiation of a second cycle of operation. The circuit by which relay 2LC2 is picked up at this time extends from (+), including back contacts 54, 55, 56, 57 and 58 of relays 2V, 1V, 3V, 4V and LCPP, front contact 59 of relay LCP, wire 60, front contact 61 of relay 2CH2, front contact 102 of relay 2CH2, front contact 103 of relay 2CH2, and upper winding of relay 2LC2, to (−).

Upon the picking up of relay 2LC2 under the above assumed conditions, the second cycle of operation becomes initiated by a mode of operation that has been heretofore described as being effective in response to the picking up of relay 3LC, and the picking up of relay LCPP in the initiation of this second cycle applies knockdown energy to the lower winding of relay 2CH2 by the energization of a circuit extending from (+), including front contact 75 of relay LCPP, wire 76, front contact 104 of relay 2CH2, lower winding of relay 2CH2, front contact 50 of relay 2LC2, back contacts 51 and 52 of relays 1LC1 and 1LC2, respectively to (−).

The same mode of operation is effective at each of the field stations in the initiation of a cycle of operation, irrespective of whether transmission is for a single cycle or a double cycle station. At the double cycle stations, however, relays ATN and ATNP (see Fig. 2A) are picked up for the initiation of each single or first cycle, and relays BTN and BTNP are picked up in accordance with the initiation of a second cycle for the associated station.

With reference to Fig. 2A, the relay ATN becomes picked up upon the picking up of relay LS at that station by the energization of a circuit extending from (+), including front contact 105 of relay LS, back contact 106 of relay BTN, and upper winding of relay ATN, to (−). When this relay becomes picked up, the relay ATNP is picked up by the energization of a circuit extending from (+), including front contact 107 of relay ATN, back contact 108 of relay BTN, and winding of relay ATNP, to (−). The mode of operation of the relays BTN and BTNP can best be understood after consideration of the mode of operation of the binary counter for counting the steps to be taken.

*Stepping.*—The stepping is accomplished by the response of the stepping relays 1V through 4V to the alternate operation of the respective left-hand and right-hand contacts of the oscillator CT at the associated station. For an understanding of the mode of operation of the stepping, the circuits will be described in detail for the stepping at the control office, and it will be readily apparent that the same mode of operation is effective for the operation of the stepping relays at each of the field stations.

The order in which the relays V are operated, and the time during which they are sustained in their energized positions is diagrammatically illustrated by vertical lines for the respective stepping relays V in the sequence chart of Fig. 6 wherein the length of the lines belonging to the respective relays is indicative of the respective times of operation and times when such relays are maintained energized or have not had time after deenergization to become dropped away.

Relay 4V is the first relay to be picked up subsequent to the initiation of a cycle, and this relay is picked up upon closure of the contact fingers 120 and 121 of the oscillator CT when its armature is rotated through center for the first time during the cycle. The circuit by which relay 4V is picked up extends from (+), including front contact 122 of relay LCPP, contact fingers 120 and 121 of oscillator CT, half-wave rectifier 123, upper winding of relay 4V, and back contacts 124, 125 and 126 of relays 3V, 2V and 1V, respectively, to (—). This relay is maintained picked up after the picking up of relay 1V at the beginning of the second step by a stick circuit extending from (+), including front contact 127 of relay LCPP, front contact 128 of relay 1V, back contact 129 of relay 2V, front contact 130 of relay 4V, and lower winding of relay 4V, to (—). When relay 2V picks up during the third step, the stick circuit for maintaining relay 4V energized extends from (+), including front contact 127 of the relay LCPP, front contact 131 of relay 2V, front contact 130 of relay 4V, and lower winding of relay 4V, to (—). When relay 2V drops away during the seventh step, the relay 4V continues to be maintained picked up by the stick circuit that has been described including front contact 128 of relay 1V, and back contact 129 of relay 2V, because relay 1V is in its picked up position at this time. At the end of the seventh step, the stick circuit just described for relay 4V is opened by the dropping away of relay 1V at front contact 128, but the left-hand contact fingers 132 and 133 of the oscillator CT are closed at this time and thus stick energy is provided for maintaining relay 4V picked up until the end of the eighth step. The stick circuit extending through the oscillator contacts extends from (+), including front contact 122 of relay LCPP, contact fingers 132 and 133 of oscillator CT, back contact 128 of relay 1V, back contact 129 of relay 2V, front contact 130 of relay 4V, and lower winding of relay 4V, to (—). The relay 4V is thus picked up at the beginning of the first step and is maintained picked up until it is deenergized at the end of the eighth step, and it is not picked up again during the cycle of operation.

Relay 1V is picked up at the beginning of the second step in response to the closure of contact fingers 132 and 133 of oscillator CT when the pendulum of the oscillator rotates through center for the second time during the cycle. The circuit by which the relay 1V is picked up at this time extends from (+), including front contact 122 of relay LCPP, contact fingers 132 and 133 of oscillator CT, half-wave rectifier 134, front contact 135 of relay 4V, back contact 136 of relay 3V, back contact 137 of relay 2V, and lower winding of relay 1V, to (—). This relay has a stick circuit for its upper winding whereby it is maintained picked up whenever the right-hand contact fingers of the oscillator CT are closed and thus this relay becomes deenergized once it is picked up at the end of the next following odd numbered step. This stick circuit extends from (+), including front contact 122 of relay LCPP, contact fingers 120 and 121 of oscillator CT, upper winding of relay 1V, and front contact 138 of relay 1V, to (—). It will be noted according to the sequence chart of Fig. 6 that the relay 1V is picked up at the beginning of alternate even numbered steps as the cycle progresses. Thus, it is picked up for a second time at the beginning of the sixth step when the contact fingers 132 and 133 become closed by the energization of a circuit extending from (+), including front contact 122 of relay LCPP, contact fingers 132 and 133 of oscillator CT, half-wave rectifier 134, front contact 135 of relay 4V, front contact 139 of relay 3V, front contact 137 of relay 2V, and lower winding of relay 1V, to (—). Similarly, relay 1V is picked up at the beginning of the tenth step by the energization of a circuit extending from (+), including front contact 122 of relay LCPP, contact fingers 132 and 133 of oscillator CT, half-wave rectifier 134, back contact 135 of relay 4V, front contact 136 of relay 3V, back contact 137 of relay 2V, and lower winding of relay 1V, to (—).

At the beginning of the fourteenth step, relay 1V is picked up by the energization of a circuit extending from (+), including front contact 122 of relay LCPP, contact fingers 132 and 133 of oscillator CT, half-wave rectifier 134, back contact 135 of relay 4V, back contact 139 of relay 3V, front contact 137 of relay 2V, and lower winding of relay 1V, to (—).

Relay 2V is picked up when the oscillator pendulum rotates through center for the third time and this relay when picked up is maintained energized until the end of the sixth step. The circuit by which relay 2V is initially picked up during a cycle extends from (+), including front contact 122 of relay LCPP, contact fingers 120 and 121 of oscillator CT, half-wave rectifier 123, front contact 140 of relay 4V, back contact 141 of relay 3V, upper winding of relay 2V, and front contact 126 of relay 1V, to (—). This relay when picked up is maintained energized until the second following even step. A first stick circuit is closed upon the shifting of the oscillator contacts to close contact fingers 132 and 133 extending from (+), including front contact 122 of relay LCPP, contact fingers 132 and 133 of oscillator CT, front contact 142 of relay 1V, front contact 143 of relay 2V, and lower winding of relay 2V, to (—). Upon the dropping away of relay 1V during the fourth step, another stick circuit is closed for relay 2V extending from (+), including front contact 127 of relay LCPP, back contact 142 of relay 1V, front contact 143 of relay 2V, and lower winding of relay 2V, to (—). When relay 1V becomes picked up at the beginning of the sixth step, the stick circuit just described for relay 2V is opened at back contact 142 of relay 1V, and relay 2V is maintained picked up by its stick circuit that has been described including contact fingers 132 and 133 of oscillator CT. However, upon the opening of contact fingers 132 and 133 at the end of the sixth step, the relay 2V becomes dropped away. Relay 2V is picked up for a second time in the cycle at the beginning of the eleventh step upon the closure of a circuit extending from (+), including front contact 122 of relay LCPP, contact fingers 120 and 121 of oscillator CT, half-wave rectifier 123, back contact 140 of relay 4V, front contact 141 of relay 3V, upper winding of relay 2V, and front contact 126 of relay 1V, to (—). Relay 2V when picked up at this time is maintained picked up until the end of the fourteenth step by the same stick circuits that have been described for maintaning this relay picked up until the end of the sixth step.

Relay 3V is picked up when the oscillator pendulum rotates through center for the fifth time during the cycle, and when picked up is maintained energized until the end of the twelfth step. The pick-up circuit for relay 3V extends from (+), including front contact 122 of relay LCPP, contact fingers 120 and 121 of oscillator CT, half-wave rectifier 123, front contact 140 of relay 4V, lower winding of relay 3V, front contact 125 of relay 2V, and back contact 126 of relay 1V, to (—). When the oscillator CT next closes its left-hand contact fingers 132 and 133, there is a stick circuit closed momentarily for the energization of the upper winding of relay 3V extending from (+), including front contact 122 of relay LCPP, contact fingers 132 and 133 of oscillator CT, back contact 128 of relay 1V, front contact 129 of relay 2V, front contact 144 of relay 3V, and upper winding of relay 3V, to (—). The relay 1V is picked up, however, in response to the closure of the contact fingers 132 and 133 at the beginning of the sixth step, and the opening of its back contact 128 opens the circuit that has been described for relay 3V, but this relay is maintained energized by a stick circuit extending from (+), including front contact 127 of relay LCPP, front contact 128 of relay 1V, front contact 129 of relay 2V, front contact 144 of relay 3V, and upper winding of relay 3V, to (—). Relay 2V becomes dropped away at the beginning of the seventh step, and another stick circuit is closed for relay 3V at this time through front contact 127 of relay LCPP, back contact 131 of relay 2V, and front contact 144 of relay 3V. This stick circuit is maintained closed until the relay 2V is picked up at the beginning of the eleventh step, and with this relay and with relay 1V picked up at this time, relay 3V is maintained energized by a stick circuit that has been described extending through front contacts 128 and 129 of relays 1V and 2V, respectively. When relay 1V is dropped away at the beginning of the twelfth step, the stick circuit through front contact 128 of relay 1V is opened, but the relay 3V is maintained energized until the end of the step by a stick circuit that has been described including contact fingers 132 and 133 of oscillator CT. The opening of these contact fingers 132 and 133 at the end of the twelfth step causes the relay 3V to become dropped away, and after dropping away, this relay remains deenergized throughout the remainder of the cycle.

The operation of the binary counter relays V at the field stations is the same as that which has been described except that energization is through back contacts 250 and 251 (see Fig. 2C) of the clear-out relay CO.

*Transmission of controls*

Having thus considered the mode of operation for the initiation of a cycle, and for the stepping of the binary counter during a cycle, consideration will now be given as to the manner in which the codes to be transmitted are determined.

To consider a specific example of code transmission, it will be assumed that the operator of the control machine designates a control for the operation of the track switch 2W to its reverse position and a control for clearing signal 10B for governing eastbound traffic over the track switch 2W. To designate these controls, the lever 3SML for the control of the track switch 2W is operated to its right-hand position, and the signal control lever 10–12SGL is operated to its right-hand position. The start button 1SPB is depressed, and the system enters a cycle of operation in a manner which has been described, and the energization of the line circuit is changed from negative to positive energization during the first step.

The station code that has been assigned to the corresponding field station No. 1 is the code (+)(−)(+) and thus the relay PC which is always picked up for positive energization of the line circuit during the first step is maintained energized during the second step to maintain the line circuit energized with a positive polarity. This energization for relay PC is provided by a circuit extending from (+), including contact fingers 160 and 161 of oscillator CT, back contact 162 of relay 3V, back contact 163 of relay 2V, front contact 164 of relay 4V, wire 2C, front contact 165 of relay 1LC1, code jumper 166, P bus, and lower winding of relay PC, to (−). Maintaining the relay PC energized during the second step provides that the line circuit is energized with a positive polarity.

Upon the shifting of the oscillator CT to close the right-hand contact fingers 167 and 168 for the initiation of the third step, a circuit is closed for the energization of relay NC for the application of negative energization to the line circuit for the second element of the station code. Relay PC is deenergized at this time by the opening of contact fingers 160 and 161 of the oscillator CT. The circuit by which relay NC is picked up under these conditions extends from (+), including contact fingers 167 and 168 of oscillator CT, front contact 169 of relay 1V, back contact 170 of relay 3V, front contact 171 of relay 4V, wire 3C, front contact 174 of relay 1LC1, code jumper 172, N bus, and lower winding of relay NC, to (−).

Because of the third element of the station code being (+), the relay NC becomes dropped away immediately upon termination of the third step upon the opening of the contact fingers 167 and 168 of oscillator CT, and the relay PC becomes picked up in accordance with the closure of contact fingers 160 and 161 of oscillator CT at substantially the same time as the contact fingers 167 and 168 of this oscillator are opened for the deenergization of the relay NC. The pick-up circuit for relay PC extends from (+), including contact fingers 160 and 161 of oscillator CT, back contact 162 of relay 3V, front contact 163 of relay 2V, front contact 173 of relay 4V, wire 4C, front contact 175 of relay 1LC1, code jumper 176, P bus, and lower winding of relay PC, to (−).

The station call code has thus been selected for transmission, and the code element for the next step is selected in accordance with the position of the switch control lever 2SML. This character is negative because the lever 2SML is assumed to have been operated to its right-hand position, and thus the relay PC becomes dropped away upon the opening of contact fingers 160 and 161 of oscillator CT at the end of the fourth step, and at the same time the closure of the right-hand contact fingers 167 and 168 of oscillator CT provides for the picking up of the relay NC. The pick-up circuit for relay extends from (+), including contact fingers 167 and 168, back contact 169 of relay 1V, front contact 177 of relay 2V, front contact 178 of relay 4V, wire 5C, front contact 179 of relay 1LC1, contact 180 of lever 2SML in its right-hand position, N bus, and lower winding of relay NC, to (−).

Relay NC is dropped away and relay PC is picked up at the beginning of the sixth step in accordance with the shifting of the contacts of the oscillator CT, the circuit for relay NC being opened by the opening of contact fingers 167 and 168, and the circuit for relay PC being closed upon the closure of the contact fingers 160 and 161. The circuit for energizing relay PC extends from (+), including contact fingers 160 and 161 of oscillator CT, front contact 162 of relay 3V, front contact 181 of relay 4V, front contact 182 of relay 2V, wire 6C, front contact 183 of relay 1CL1, contact 184 of lever 10–12SGL in its right-hand position, P bus, and lower winding of relay PC, to (−).

The character to be transmitted during the seventh step must be negative and thus the relay PC is dropped away at the beginning of the seventh step by the opening of contact fingers 160 and 161 of oscillator CT and the relay NC is picked up upon the closure of contact fingers 167 and 168 of the oscillator CT. The pick-up circuit for relay NC extends from (+), including contact fingers 167 and 168 of oscillator CT, front contact 169 of relay 1V, front contact 170 of relay 3V, front contact 185 of relay 4V, wire 7C, front contact 186 of relay 1LC1, contact 187 of lever 10–12SGL in its right-hand position, N bus, and lower winding of relay NC, to (−).

Having thus described specifically how a code is selected for transmission to the typical field station No. 1 for the control of a switch and a signal, it will be readily apparent that control codes for other track switches and other signals can be similarly selected for the steps of the remainder of the cycle, there being a distinctive channel wire C for use in the selection of such a code for each of the remaining steps of the cycle.

Upon the dropping away of relay 2V during the fifteenth step, a circuit is closed for the energization of the oscillator CT extending from (+), including back contact 78 of relay 2V, back contact 79 of relay 3V, back contact 80 of relay 4V, front contact 82 of relay LCP and winding of oscillator CT, to (−).

The dropping away of relay 2V also causes the dropping away of relay 1LC1 by the opening of a stick circuit for this relay which has been maintained through front contact 67 of relay 2V. It will be noted that all of the other stepping relays are in their deenergized positions at this time except for the relay 1V, and by reason of this relay being picked up, the circuit including back contact 66 is open.

Either relay PC or NC may be picked up during the fifteenth step in accordance with the code selected for transmission during that step, and immediately following the fifteenth step, the relay NC is energized to restore the normal condition of negative energization of the line circuit. Thus, relay NC becomes energized upon the dropping away of relay 1V at the end of the fifteenth step upon the closure of a circuit extending from (+), including back contact 188 of relay 1V (see Fig. 1C), normally closed contact 189 of button CPB, back contact 190 of relay PC, front contact 191 of relay LCP, and lower winding of relay NC, to (−). The stick circuit for the upper winding of relay NC is maintained energized during the subsequent dropping away of the relay LCPP to establish the stick circuit that has been described as being normally effective to maintain relay NC energized when the system is at rest. This stick circuit extends from (+), including normally closed contact 192 of push button CPB, front contact 193 of relay LCP, back contact 45 of relay PC, front contact 46 of relay NC and upper winding of relay NC, to (−). Relay LCP is in its picked up position at this time for the circuit just described because of it having become picked up at the beginning of the fourteenth step in response to the picking up of the stepping relay 1V. The circuit by which relay LCP is energized at this time extends from (+), including front contact 194 of relay 1V, back contact 195 of relay 3V, back contact 196 of relay 4V, and lower winding of relay LCP, to (−). Relay LCP when thus picked up is maintained energized throughout a following period of rest, or until initiation has become effective for a second cycle of operation. The relay LCPP becomes dropped away upon the dropping away of relay 1V by the opening of a circuit by which it has been maintained energized by a stick circuit extending from (+), including front contact 197 of relay LCPP, front contact 198 of relay 1V, and lower winding of relay LCPP, to (−).

A similar mode of operation for termination of a cycle becomes effective at each of the field stations, and the mode of operation at the double cycle field station No. 1 for the completion of the first cycle will now be considered. With reference to Fig. 2A, the relay BTN which is associated with the two-cycle operation becomes picked up during the fourteenth step and the relay ATNP becomes dropped away. The circuit by which relay BTN becomes picked up extends from (B+), including front contact 199 of relay PF, front contact 200 of relay LS, contact fingers 201 and 202 of oscillator CT1, wire 203, front contact 204 of relay 2V1, back contact 205 of relay 3V1, front contact 206 of relay 1V1, back contact 207 of relay 4V1, wire 208, back contact 209 and upper winding of relay BTN, to (CN). This relay when picked up is maintained energized by a stick circuit extending from (+), including front contact 105 of relay LS, front contact 106 of relay BTN, and lower winding of relay BTN, to (−). It will be noted that in order to pick up the relay BTN by energization transmitted over the line circuit during the fourteenth step as has been described, it is necessary that the element selected for transmission during this step at the control office always be determined as a positive code element. If a negative code character is received during the fourteenth step, the upper winding of relay BTN is short-circuited because of the application of (B−) polarity to its control circuit at front contact 210 of relay NF, rather than the application of positive polarity as has been described at front contact 199 of relay PF. The corresponding channel in the second cycle, however, can be used as a regular control channel.

Relay BTN when picked up is maintained energized throughout the second cycle, and the picking up of this relay is effective to cause the dropping away of the relay ATNP by opening the circuit by which the relay ATNP has been maintained energized at back contact 108. With reference to Fig. 2A, the oscillator CT1 becomes energized during the fifteenth step to cause it to become locked up. The circuit by which relay CT1 becomes energized extends from (+), including front contact 211 of relay ATN, front contact 84 of relay BTN, back contact 86 of relay 2V1, back contact 87 of relay 3V1, winding of oscillator CT1, and front contact 88 of the line relay NF, to (−). If the relay NF is not picked up at this time because of the transmission of a (+) code character during the fifteenth step, the oscillator CT1 becomes energized upon termination of the fifteenth step after the normal condition of negative energization of the line circuit has been set up as has been described.

Considering now the mode of operation upon initiation of a second cycle at the control office, and particularly assuming that the second cycle is for the transmission to the two-cycle field station No. 1, the dropping away of the relay LCPP (see Fig. 1C) at the end of the first cycle closes a circuit by which relay 2LC1 (see Fig. 1A) may be picked up for the initiation of the second cycle. When this relay is picked up, the initiation of the second cycle of operation takes place the same as has been heretofore described for the initiation of a first cycle. The second cycle is different, however, in the selection of the code for transmission because of different control codes being required to be transmitted, and because of it being unnecessary to retransmit the station selection code.

It is, however, necessary to transmit a distinctive condition over the line circuit for the purpose of rendering all the field stations, except the field station called, nonresponsive to the control codes to be subsequently transmitted during the second cycle. In other words, there is no circuit closed during the second step of the second cycle for the energization of a relay PC or NC (see Fig. 1C) at the control office, and thus, because of both of these relays being simultaneously deenergized during the second step, there is no energy applied by the line battery LB to the line wires L1 and L2. This creates an abnormal condition as compared to the transmission of a selected positive or negative station selection code element during the second step, and upon receiving this abnormal condition at all of the field stations, except the station that was selected during the first cycle, the station relays LS become dropped away.

Figure 1D:
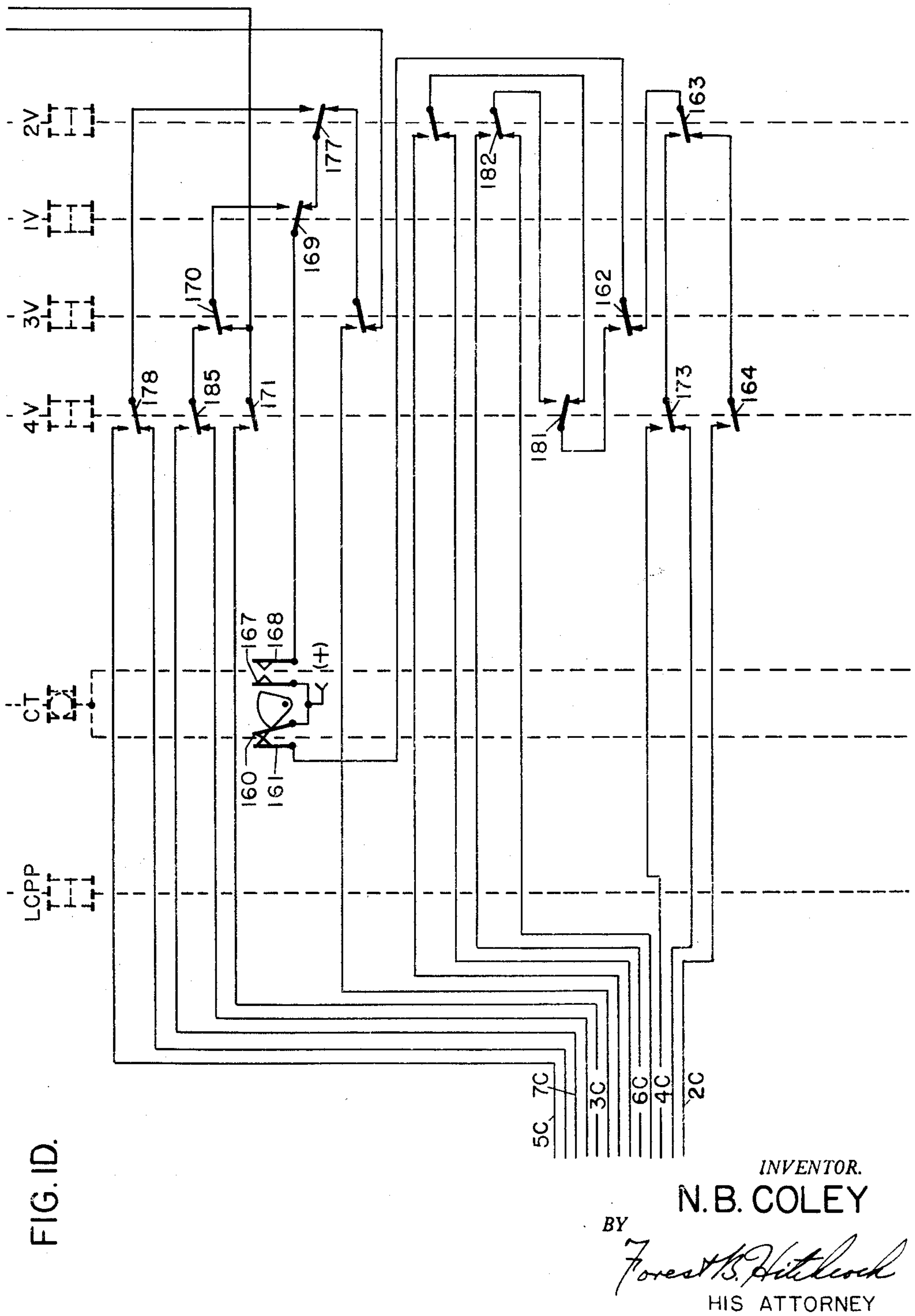

The code element selected for transmission during the third step of the second cycle is selected in accordance with the control designated for a device as is illustrated in Fig. 1A wherein the code element selected for transmission during the third step is in accordance with the position of the switch control lever 3SML that is provided for governing the operation of the track switch 3W. If this lever is in its normal position as illustrated, the relay PC is picked up for the transmission of a positive code element because of the energization of the P bus by a circuit extending from (+), including contact fingers 167 and 168 (see Fig. 1D) of oscillator CT (see Fig. 1D), front contact 169 of relay 1V, back contact 170 of relay 3V, front contact 171 of relay 4V, wire 3C, contact 281 of relay 1LC2, contact 212 of lever 3SML in its left-hand position, P bus, and lower winding of relay PC, to (−). Should the lever 3SML be operated to its right-hand position for designating the reverse position for the track switch 3W, the shifting of contact 212 of this lever obviously would provide for the energization of the relay NC rather than for the energization of the relay PC. In a similar manner, the code for the control of other devices such as the control of the signals as governed by the lever 13-15SGL (see Fig. 1B) are selected during the subsequent steps to be taken during the second cycle of operation.

*Station selection*

Means has been described for initially energizing the station selecting relay LS (see Fig. 2A) through contacts 92, 93 and 94 of the stepping relays 2V1, 1V1 and 3V1, respectively. After relay 1V1 becomes picked up during the second step, this pick-up circuit is maintained open, and the sustained energization of the relay LS is maintained dependent upon code jumpers during the subsequent steps of the station selection code.

Thus, during the second step, a stick circuit is closed for relay LS extending from (B+), including front contact 199 of relay PF, front contact 200 of relay LS, contact fingers 201 and 202 of oscillator CT1, wire 203, back contact 204 of relay 2V1, front contact 214 of relay 4V1, back contact 215 of relay 3V1, front contact 216 of relay 1V1, back contact 217 of relay BTN, code jumper 218, (+) bus, front contact 220 of relay LS, back contact 96 of relay NF, lower winding of relay LS, and front contact 97 of relay PF, to (B−). Relay LS is maintained picked up during the time interval involved in the picking up of the stepping relay 1V1 by reason of its upper winding being shunted through front contact 98. In case the code element received during the second step is negative rather than positive, the relay LS at the field station illustrated in Fig. 2A becomes dropped away during the second step because the stick circuit just described is open at back contact 96 of relay NF.

If the second element of the station code that is received during the third step is (−), the relay LS for the field station illustrated in Fig. 2A is maintained picked up during the third step by a stick circuit extending from (B+), including front contact 96 of relay NF (see Fig. 2A), lower winding of relay LS, back contact 97 of relay PF, front contact 222 of relay LS, (−) bus, code jumper 223, wire 3C1, front contact 224 of relay ATN, front contact 225 of relay 1V1, front contact 226 of relay 4V1, front contact 227 of relay 2V1, wire 228, back contact 229 of relay 3V1, contact fingers 230 and 231 of oscillator CT1, front contact 200 of relay LS, back contact 199 of relay PF, and front contact 210 of relay NF, to (B−). If a positive code element is received during the third step, the circuit just described is opened at contacts 96 and 210 of relay NF, and thus the relay LS becomes dropped away on lack of correspondence of the code received with the station code assigned to the associated field station.

The third element of the station code is required to be a positive code element for the field station illustrated in Fig. 2A. Inasmuch as this is the last element of the station code for the particular condition illustrated, the station selecting relay LSP is picked up in response to this element, and a stick circuit is also closed to maintain the relay LS energized until relay LSP is picked up.

This stick circuit extends from (B+), including code jumper 267 (see Fig. 2B), back contact 268 of relay LSP, back contact 269 of relay 1V1, back contact 270 of relay LSP, code jumper 271, (+) bus, front contact 220 of relay LS, back contact 96 of relay NF, lower winding of relay LS, and front contact 97 of relay PF, to (B−). The pick-up circuit provided for relay LSP during the fourth step extends from (B+), including front contact 199 of relay PF, front contact 200 of relay LS, contact fingers 201 and 202 of oscillator CT1, wire 203, front contact 204 of relay 2V1, back contact 205 of relay 3V1, back contact 206 of relay 1V1, front contact 232 of relay 4V1, front contact 233 of relay ATN, code jumper 234, wire 235, code jumper 236, lower winding of relay LSP, and code jumper 237, to (B−).

Relay LSP when thus picked up is maintained energized until the end of the cycle by a stick circuit including front contacts 238, 239 and 240 of relays 2V1, 3V1 and 4V1, respectively, in series with front contact 241 of relay LSP and the upper winding of relay LSP. An additional stick circuit is closed to maintain the relay LSP picked up during transmission from the first to the second cycle extending from (+), including front contact 107 of relay ATN, front contact 108 of relay BTN, front contact 241 of relay LSP and upper winding of relay LSP, to (−). The jumpers 236 and 267 are positioned in accordance with whether the last element of the station code is of positive or negative polarity. Relay LSP when picked up maintains relay LS energized during each positive code element received by a circuit extending from (B+), including front contact 242 of relay LSP, front contact 220 of relay LS, back contact 96 of relay NF, lower winding of relay LS, and front contact 97 of relay PF. Relay LS is maintained energized during the reception of negative code elements by a circuit extending from (B+), including front contact 96 of relay NF, back contact 97 of relay PF, front contact 222 of relay LS, and front contact 243 of relay LSP.

*Reception of controls*

For this embodiment of the present invention, the code element received during the fifth step is for the control of the track switch 2W (see Fig. 2C) and thus the magnetic stick relay 2WZ is conditioned in accordance with the polarity of energization of the channel wire 5C1 during the fifth step. If the code element received during the fifth step is a positive element, the relay 2WZ becomes energized with a polarity to cause the relay to be operated to its dropped away position for operation of the track switch 2SM to its normal position, and if the code element is negative during the fifth step the relay 2WZ is picked up to close its front contacts 244 and 245 to provide for the power operation of the track switch 2W to its reverse position. The circuit by which the relay 2WZ is energized in response to a positive code element extends from (B+), including front contact 199 of relay PF (see Fig. 2A), front contact 200 of relay LS, contact fingers 230 and 231 of oscillator CT1, front contact 229 of relay 3V1, back contact 246 of relay 1V1, front contact 247 of relay 4V1, front contact 248 of relay 2V1, front contact 249 of relay ATN, wire 5C1, and winding of relay 2WZ, to (CN). If the code element is negative, the relay 2WZ is energized with the opposite polarity by a circuit exending from the center tap (CN) of the battery through the winding of relay 2WZ, wire 5C1, front contact 249 of relay ATN, front contact 248 of relay 2V1, front contact 247 of relay 4V1, back contact 246 of relay 1V1, front contact 229 of relay 3V1, contact fingers 230 and 231 of oscillator CT1, front contact 200 of relay LS, back contact 199 of relay PF and front contact 210 of relay NF, to (B−).

Following the transmission of the switch control, the steps six and seven are used for the control of the signal control relays 10–14RGZ and 10–14LGZ (see Fig. 2C) respectively. These relays are picked up only in response to positive code elements during their respective steps, and they are dropped away to put the associated signals to stop in accordance with the reception of respective negative code elements. If it is assumed that the code transmitted is for the clearing of a signal governing traffic to the right, the relay 10–14RGZ is picked up during the sixth step by the energization of a circuit extending from (B+), including front contact 199 of relay PF (see Fig. 2A), front contact 200 of relay LS, contact fingers 201 and 202 of oscillator CT1, wire 203, front contact 204 of relay 2V1, front contact 205 of relay 3V1, front contact 252 of relay 1V1, front contact 253 of relay 4V1, front contact 254 of relay ATNP, wire 6C1, back contact 255 of relay 10–14LGZ, lower winding of relay 10–14RGZ, resistor R2, upper winding of relay RGZ, half-wave rectifier 256, and front contact 257 of track relay TR, to (CN).

It will be noted that the upper winding of relay 10–14RGZ is shunted through back contact 258, and thus a higher degree of energization is established momentarily for the energization of the lower winding of relay 10–14RGZ initially to render this relay quicker to pick up. During the shifting of the contacts of this relay, the circuit described through the windings in series is maintained energized in order to insure the completion of operation of the relay. The rectifier 256 is included in the circuit to prevent the upper winding from acting as a shunt and thus providing slow action during pick up. Because of the fast rate of operation of this code communication system, it is highly desirable that the relays operated in response to the codes received be operated as quickly as possible, and thus it has been found that by shunting the upper winding through the back contact of the relay, as has been described, and by making the lower winding of the relay of relatively low resistance, a relatively large number of ampere terms are initially set up in this lower winding so as to provide for quicker operation. Upon the opening of the back contact 258 of the relay 10–14RGZ, the shunt on the upper winding of the relay is removed, and the relay continues to be energized for the remaining portion of its travel in picking up through the two windings connected in series. This insures completion of operation of the relay to its picked up position, and when the relay becomes picked up, the closure of its front contact 258 establishes a stick circuit including the upper winding of relay 10–14RGZ and front contact 257 of the track relay TR to maintain the relay picked up after termination of the momentary pulse that has been applied. This stick circuit is maintained closed until the passage of a train actuates the track relay TR or until a stop control is transmitted from the control office. Upon the picking up of relay 10–14RGZ, the closure of front contact 259 provides for the clearing of a signal 10A or 10B, selected in accordance with the position of the track switch 2W. In case it is desirable to put the signal 10A or 10B to stop by a control transmitted from the control office, a negative code element is transmitted during the sixth step, and the reception of this negative element energizes the lower winding of relay 10–14RGZ with reverse polarity so that this relay becomes dropped away because of the reversal of its flux. The circuit by which relay 10–14RGZ is energized upon the reception of a negative code element extends from (B+), including front contact 258 of relay 10–14RGZ, lower winding of relay 10–14RGZ, back contact 255 of relay 10–14LGZ, wire 6C1, front contact 254 of relay ATNP, front contact 253 of relay 4V1, front contact 252 of relay 1V1, front contact 205 of relay 3V1, front contact 204 of relay 2V1, wire 203, contact fingers 201 and 202 of oscillator CT1, front contact 200 of relay LS, back contact 199 of relay PF, and front contact 210 of relay NF, to (B−). The inclusion of the resistor R2 in series with the upper winding of relay 10–14RGZ limits the current through the upper winding of the relay to provide an ampere turn advantage when the lower winding is energized with reverse polarity as has been described for knockdown purposes upon reception of a stop control. The opening of front contact 259 of relay 10–14RGZ restores the particular signal 10A or 10B (whichever has been cleared) to stop.

Having thus described specifically the circuit organization for the control of a signal governing eastbound traffic, it is to be understood that a similar mode of operation is effective in the control of the relay 10–14LGZ for the control of signals governing westbound traffic. Also having described the reception of typical switch and signal controls on certain steps during a cycle of operation, it is to be understood that a similar mode of operation is provided in controlling a larger number of similar devices during the same cycle of operation, all of the controls transmitted during a first cycle at a two-cycle station being selected through respective front contacts of the relay ATNP, while the controls received during a second cycle at a two-cycle station are selected through front contacts of relay BTNP.

Relays ATN and ATNP are picked up upon initiation of a first cycle at a two-cycle field station as has been described and both of these relays are maintained picked up throughout the first cycle. The picking up of relay BTN, however, during the fourteenth step as has been described causes the dropping away of relay ATNP by the opening of its circuit at back contact 108 (see Fig. 2A), and thus the relay ATNP when dropped away opens the connection of the channel circuits to the respective devices governed by these channel circuits during the first cycle of operation.

Upon initiation of the second cycle for transmission to a two-cycle station, the relay ATN at the two-cycle station is dropped away when the stepping relay 4V1 is picked up during the first step because of the opening of a stick circuit for this relay at back contact 83 (see Fig. 2A). When relay ATN becomes dropped away, a circuit is closed for the picking up of relay BTNP extending from (+), including back contact 107 of relay ATN, back contact 260 of relay ATNP, front contact 261 of relay BTN, and winding of relay BTNP, to (−). Relay BTNP when picked up is maintained picked up throughout the remainder of the second cycle, and thus this relay connects a second group of controls to the control channels through its respective front contacts, the devices to be controlled during the second cycle of operation being controlled in a manner comparable to that which has been specifically described for the control of switches and signals during the first cycle of operation.

*Clear-out*

If the binary counter at any one of the field stations should fail for some reason to complete its operation during a cycle, such as because of a dirty contact, the oscillator CT1 at that station would run down, and there could be no circuit closed for its energization as is the normal condition at the end of a cycle of operation. This condition would, of course, render the apparatus at that field station nonresponsive, and inasmuch as the fault could be momentary due to dust on a relay contact, it is considered desirable to be able to automatically effect a clearout of the binary counter so that the oscillator CT1 can be energized and in order that the apparatus can be restored to its normal condition so that another try at its operation can be made.

The clear-out relay CO (see Fig. 2A) is provided for this purpose, and this relay is maintained deenergized except when an abnormal condition arises. During a cycle of operation, there is a circuit closed for the relay CO including resistor R3 and front contact 262 of relay LSP, but the condenser C1 of relatively high capacity is connected in multiple with the relay CO so that relay CO cannot be picked up until the condenser C1 becomes charged. The resistor R3 limits the rate of charge and thus it is provided that the relay CO will not have time to be picked up during a normal cycle of operation. However, if the cycle should become abnormally long at a station that has its LSP relay up, as is the case if the stepping is not completed, the charge builds up sufficiently on the condenser C1 to cause the picking up of the cutout relay CO. This relay, when picked up, opens the energizing circuits for the counting relays 1V1 to 4V1 inclusive by the opening of back contacts 250 and 251 (see Fig. 2C) and thus causes the restoration of these relays to their normally deenergized positions. When this has been accomplished, the circuit for the normal energization of the oscillator CT1 can be established and thus the normal conditions at the field station can be restored and the cut-out relay CO is restored to its dropped away condition. The condenser C1 is discharged at the beginning of each cycle by a shunt applied through back contact 263 of relay LSP, front contact 264 of relay LS and resistor R4. It is discharged at a two-cycle station between the first and second cycles by a shunt applied on the condenser C1 through back contact 265 of relay BTNP and front contact 266 of relay BTN.

The picking up of the relay CO can be effective to transmit an indication to the control office via the suitable indication communication system (not shown) so that the operator at the control office can be advised that the controls that were transmitted may not have been received and he can manipulate his control machine so as to retransmit the controls that were intended for the associated field station.

In addition to the above described automatic clear-out means provided for a selected field station, it is provided that if a field station that is not being called fails to complete its operation, a clear-out control can be transmitted by the operator of the control machine at the control office to cause all stations to pick up their clear-out relays CO and effect a clear-out of the system as has been described. This mode of operation is accomplished by the actuation of the push button CPB (see Figs. 1C) at the control office. The actuation of this button opens the normally energized circuit for the relay NC at button contact 192 and thus causes relay NC to become dropped away. This relay when dropped away closes a circuit to maintain the relay LCP picked up extending from (+), including back contact 272 of relay NC, back contact 273 of relay LCPP, and lower winding of relay LCP, to (−). Because of relay LCP being maintained picked up, the oscillator CT is maintained energized through front contact 82 after the relay LCPP becomes picked up to open its back contact 81. Relay LCPP is picked up by the energization of a circuit including contact 192 of push button CPB, and front contact 73 of relay LCP. This relay when picked up closes a circuit at front contact 75 to restore any storages that may be maintained at this time by the knocking-down of any relays CH that may be in their picked up positions.

The dropping away of relay NC opens the line circuit upon the opening of its front contacts 41 and 43, and the operator maintains the push button CPB in its depressed position for a time interval sufficient to cause all of the relays CO at the field stations to become picked up. This time interval can be an interval of 4 or 5 seconds. Upon restoration of the button CPB to its normal position, the normal conditions of the system at the control office are restored.

At the field stations, the deenergization of the relays NF provides charging circuits for the condenser C1. At the field station illustrated in Fig. 2A, for example, the dropping away of relay NF closes a charging circuit for the condenser C1 which is connected in multiple with the winding of the cut off relay CO. This circuit extends from (+), including condenser C1 connected in multiple with the winding of relay CO, resistor R3, and back contact 274 of relay NF, to (−). Upon the picking up of relay CO, the clearing out of the apparatus at the associated field station is effective in the same manner as has been described, when it was assumed that the relay CO had been picked up upon automatic detection of an abnormal condition.

Figure 4:
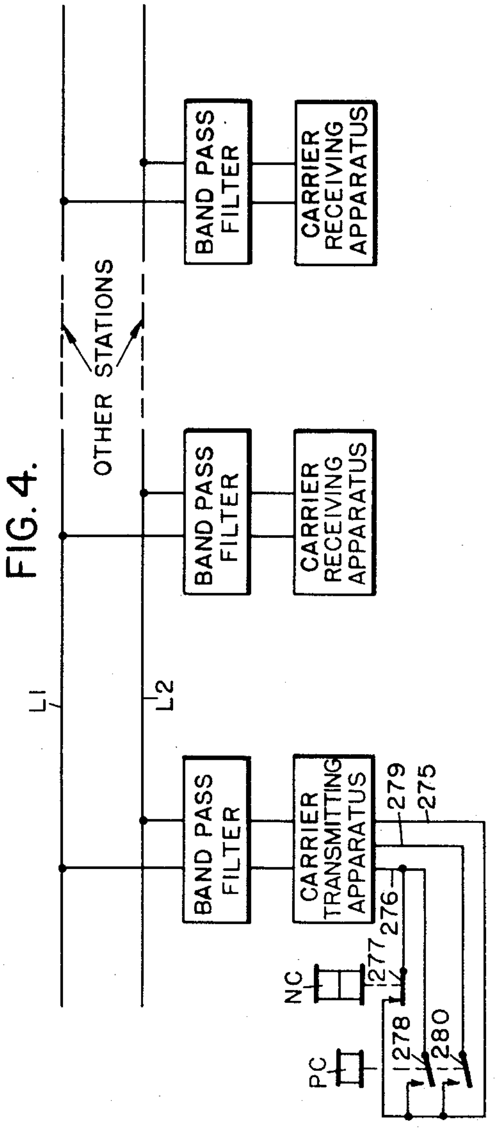
Fig. 4 illustrates a line circuit communication system which may be employed in accordance with the present invention wherein carrier currents are used for the transmission of the code elements.

If it is desirable to use carrier currents for the communication of the code elements over the code communication channel, the organization illustrated in Fig. 4 may be used. The relays PC and NC of Fig. 4 are assumed to be the same relays PC and NC that have been described with reference to Fig. 1C as being used for transmitting from the control office. These relays PC and NC of Fig. 4 are used to cause the transmission of respective selected carrier current and shift frequencies as compared to the transmission of respective positive and negative code elements by direct current energization of the line wires L1 and L2 has has been described in detail.

The carrier transmitting apparatus is illustrated in block form in Fig. 4 and it is selectively rendered effective to transmit a carrier or a shift frequency in accordance with whether relay NC or relay PC is picked up respectively. The carrier frequency is transmitted if a circuit is closed between wires 275 and 276 through front contact 277 of relay NC. A front contact 278 of relay PC is connected in multiple with the front contact 277 of relay NC so that a connection is made between the wires 275 and 276 for the transmission of the shift frequency as well. It is also provided, for the transmission of the shift frequency, that a circuit is closed between the wires 275 and 279 through front contact 280 of relay PC. Thus, the wire 275 is a common wire used for transmission of either the carrier or the shift frequency, wire 276 is energized for the transmission of either frequency, and the wire 279 is connected to the common wire 275 only for transmission of a shift frequency.

Conventional carrier receiving apparatus is used at each field station to energize receiving relays (not shown) comparable to the line relays PF and NF illustrated in Fig. 2A which are distinctively responsive to the code elements communicated over the communication channel.

Having thus described a centralized traffic control system for the control of typical switches and signals as one embodiment of the present invention, it is desired to be understood that this embodiment has been selected in order to most advantageously disclose the features of the present invention, and that the present invention may be applied to the remote control of devices other than those herein illustrated, and it is further understood that various adaptations, modifications and alterations may be made to the specific form shown without departing from the spirit or scope of the present invention except as limited by the appending claims.

What I claim is:

1. A code communication system for communicating designated controls from a control office to a plurality of remotely spaced field stations having respective devices to be controlled, code communication apparatus normally in a condition of rest operable through a cycle of operation when initiated to communicate designated controls by selected codes from the control office to the field stations, said code communication apparatus being restored to said condition of rest at the end of each cycle of operation, initiating and storage means for determining the order of transmission of successive cycles of operation under conditions where initiation is stored for a plurality of cycles, said initiating and storage means for one field station being effective when rendered active to initiate successively first and second cycles for that station, code selecting means at the control office for each of the field stations for selecting the codes to be transmitted to the associated field stations during respective cycles of operation, said code selecting means being effective for the first several code elements of said first cycle to select a distinctive station selection code assigned to said one field station for transmission during said first cycle, and said code selecting means being effective at the beginning of said second cycle to select a distinctive character for transmission by said code communication apparatus during the communication of a particular code element rather than transmit a station selection code at the beginning of the second cycle, station selection means at each field station responsive only to the station code assigned to the associated station, said station selection means being nonresponsive to said distinctive character transmitted during said second cycle, and means for maintaining said station selecting means at each station actuated during said second cycle if it has been responsive during said first cycle.

2. In a code communication system for communicating designated controls by selected codes from a control office to a plurality of remotely spaced field stations, code communication apparatus normally in a condition of rest including a communication channel connecting the control office and the field stations and effective when initiated to communicate designated controls by selected codes over a single communication channel from the control office to the field stations during respective cycles of operation, said code communication apparatus being restored to said condition of rest at the end of each cycle of operation, initiating and storage means at the control office for determining the order of transmission of successive cycles of operation, said initiating and storage means for a particular field station having a start button and first and second storage relays, and said initiating means having a code determining relay for each of the storage relays, circuit means for energizing said first storage relay in response to the actuation of said start button and in turn for energizing one of said code determining relays, stick circuit means effective for maintaining each of the code determining relays energized when picked up for the duration of a cycle of operation of the code communication apparatus, circuit means for automatically energizing said second storage relay in response to the picking up of said one code determining relay, and in turn for energizing the other of said code determining relays after said one code determining relay is deenergized for determining the code for transmission during a second cycle of operation to the same field station, and means for deenergizing each of said storage relays when the associated code determining relay is energized.

3. In a code communication system for communicating designated controls by selected codes from a control office to a plurality of remotely spaced double-cycle field stations, code communication apparatus normally in a condition of rest effective when initiated to communicate designated controls by selected codes from the control office to the field stations over a single communication channel during a cycle of operation, said code communication apparatus being restored to said condition of rest at the end of each cycle of operation, initiating and storage means at the control office for each of the field stations for rendering said code communication apparatus active, said initiating and storage means for each of the field stations having a start button and first and second storage relays, said initiating means having a code determining relay for each of the storage relays, circuit means for energizing said first storage relay in response to the actuation of said start button and in turn energizing one of said code determining relays, said circuit means being effective to maintain said code determining relay energized for the duration of a cycle of operation and to prevent the energization of another code determining relay during that cycle, circuit means for automatically energizing said second storage relay in response to the picking up of said one code determining relay and in turn for subsequently energizing the other of said code determining relays for determining the code of a second cycle of operation, and said initiating circuit means being effective to transmit to the double-cycle field stations in sequence in case starts for transmission to more than one of the double-cycle stations are designated substantially simultaneously.

4. In a code communication system for communicating designated controls by selected codes from a control office to a plurality of remotely spaced single cycle and double cycle field stations, code communication apparatus normally in a condition of rest effective when initiated to communicate designated controls by selected codes from the control office to the field stations over a single communication channel during a cycle of operation, said code communication apparatus being restored to said condition of rest at the end of each cycle of operation, initiating and storage means at the control office for each of the field stations for rendering said code communication apparatus active to transmit selected control codes during a cycle of operation, said initiating and storage means for each of the single cycle field stations having a start button and one storage relay and for each of the double cycle field stations having a start button and first and second storage relays, a code determining relay at the control office for each of the storage relays, circuit means for energizing said one storage relay and said first storage relays in response to the actuation of the associated start buttons respectively and in turn for energizing the associated code determining relays respectively, circuit means for energizing said second storage relay for each of the two cycle stations automatically in response to the picking up of said code determining relay associated with the first storage relay for that station and in turn for subsequently energizing said code determining relay associated with the second storage relay for that station for determining the codes for a second cycle of operation, and circuit means for causing said initiating means to be effective for the different stations in a predetermined sequence in case starts for transmission to a plurality of these stations is designated substantially simultaneously.

5. In a code communication system for communicating designated controls by selected codes from a control office to a remote field station, normally at rest code communication apparatus effective when initiated to transmit a selected code from the control office to the field station over a single communication channel during a cycle of operation, a start button at the control office having a normal position, initiating and storage means at the control office for the field station, said initiating and storage means having a storage relay, and said initiating means having a code determining relay associated with said storage relay, circuit means for energizing said storage relay in response to the actuation of said start button, and circuit means including a contact of said start button closed only when said button is in its normal position for energizing said code determining relay in response to the energization of the storage relay for the associated station, only provided said button for the associated station is restored to its normal position, and circuit means responsive to the energization of said code determining relay for initiating said code communication apparatus into a cycle of operation, whereby the code communication apparatus cannot be initiated into a cycle of operation in response to the actuation of the start button unless the start button has first been restored to its normal position.

6. In a code communication system for communicating designated controls by selected codes from a control office to a plurality of remotely spaced field stations, normally at rest code communication apparatus effective when initiated to communicate designated controls by codes from the control office to the field stations during respective cycles of operation, said code communication apparatus having a normally deenergized bank of counting relays and a normally deenergized clear-out relay at each of the field stations, circuit means for selectively energizing the counter relays during a cycle of operation through a back contact of said clear-out relay, and other circuit means for automatically energizing said clear-out relay in response to the counting relays only in case one of said counter relays remains energized for an abnormal length of time, whereby the code communication apparatus at each field station can be automatically reset by the clear-out relay to its normal condition in case it becomes locked up by an abnormal condition of operation.

7. In a code communication system for communicating designated controls by selected codes from a control office to a field station, normally at rest code communication apparatus including a communication channel and effective when initiated to communicate designated controls by codes from the control office to the field station during respective cycles of operation, said code communication apparatus having a normally deenergized bank of counting relays and a normally deenergized clear-out relay at the field station, means for energizing the counting relays dependent upon the deenergized condition of said clear-out relay, circuit means for energizing said clear-out relay in response to the counting relays only in case one or more of said counting relays remains energized for an abnormal length of time, and said circuit means being effective to energize said clear-out relay in response to the communication channel only in case there is an abnormal condition of the communication channel connecting the control office and the field station, whereby the code communication apparatus at the field station can be reset by the clear-out relay to its normal condition in case it becomes locked up by failure to complete a cycle of operation.

8. In a code communication system for communicating designated controls by selected codes from a control office to a remote field station, normally at rest code communication apparatus effective when initiated to communicate designated controls over a communication channel by codes from the control office to the field stations during respective cycles of operation, said code communication apparatus having relays at the field station subject to energization during each cycle of operation and having a normally deenergized clear-out relay, circuit means for energizing the counting relays dependent upon the deenergized condition of said clear-out relay, a condenser connected in multiple with the winding of said clear-out relay, charging and discharging means acting upon said condenser at different times during each cycle of operation of the code communication apparatus, said charging means being effective to charge said condenser sufficiently to permit the picking up of said clear-out relay only provided that the code communication apparatus at the associated station fails to complete a cycle of operation, or only provided that an abnormal condition persists over the communication channel, and means responsive to the picking up of said clear-out relay for restoring the code communication apparatus at the associated station to its normal condition.

9. In a code communication system for communicating designated controls from a control office to a field station, code communication apparatus including a communication channel connecting the control office and the field station for communicating code elements during successive steps constituting a cycle of operation, relays for the control of respective devices at the field station subject to energization during particular successive steps of the code communication apparatus, each of said relays having respective high and low resistance windings, an asymmetric device for each of said relays, circuit means for connecting both of said windings of each of said relays in series for energization during the particular step of the code communication apparatus with which that relay is associated, said circuit means being effective to shunt said high resistance winding through a back contact of the associated relay and through said asymmetric device, whereby the code communication system can operate at high speed because each of the relays is made quick to pickup during the stepping operation.

10. In a code communication system for communicating a plurality of controls for similar groups of devices by the same selected control codes from a control office to each of a plurality of remotely spaced field stations, code communication apparatus normally in a condition of rest effective when initiated to communicate station identity and designated controls for said devices by selected codes during a single cycle of operation, said code communication apparatus being restored to said condition of rest at the end of each cycle of operation, code determining and initiating means at the control office for initiating said code communication apparatus from said condition of rest into respective first and second successive cycles of operation, said code determining means selecting control codes for certain of said devices for transmission during said first cycle and control codes for others of said devices at the same station during said second cycle, said code determining means being effective to select a distinctive station code belonging to the station being called comprising several code elements during the first part of said first cycle, and said code determining means being effective to select a single character for transmission at the beginning of said second cycle distinct from the character transmitted as a corresponding element in any station selecting code for any station, station selecting means at each of the field stations responsive only to the station code assigned to that station for rendering that station responsive to control codes for governing said devices, and means for maintaining said station selecting means responsive during said second cycle provided that it has been responsive during said first cycle.

References Cited in the file of this patent

UNITED STATES PATENTS

| | | |
|---|---|---|
| 1,207,016 | Fryer | Dec. 5, 1916 |
| 1,689,294 | Potts | Oct. 30, 1928 |
| 1,995,272 | Brixner | Mar. 19, 1935 |
| 2,126,210 | Preston | Aug. 9, 1938 |
| 2,129,183 | Preston et al. | Sept. 6, 1938 |
| 2,230,859 | Blake et al. | Feb. 4, 1941 |
| 2,259,561 | Hailes | Oct. 21, 1941 |
| 2,373,134 | Massonneav | Apr. 10, 1945 |
| 2,389,275 | Rayner et al. | Nov. 20, 1945 |
| 2,418,415 | Leser | Apr. 1, 1947 |
| 2,453,281 | Tedder | Nov. 9, 1948 |
| 2,561,722 | Bascom | July 24, 1951 |
| 2,626,314 | Coley | Jan. 20, 1953 |
| 2,675,537 | Cahill | Apr. 13, 1954 |
| 2,698,425 | Miller | Dec. 28, 1954 |
| 2,759,429 | Bubb | Aug. 21, 1956 |
| 2,768,335 | Coley | Oct. 23, 1956 |